(12) United States Patent
Suelflow

(10) Patent No.: US 11,166,551 B2
(45) Date of Patent: Nov. 9, 2021

(54) LOW PROFILE CABINET ORGANIZER

(71) Applicant: Jeremy Suelflow, Franklin, TN (US)

(72) Inventor: Jeremy Suelflow, Franklin, TN (US)

(73) Assignee: Summit Product Development, LLC, Gulf Breeze, FL (US)

( * ) Notice: Subject to any disclaimer, the term of this patent is extended or adjusted under 35 U.S.C. 154(b) by 0 days.

(21) Appl. No.: 17/155,081

(22) Filed: Jan. 21, 2021

(65) Prior Publication Data
US 2021/0212465 A1 Jul. 15, 2021

Related U.S. Application Data

(63) Continuation-in-part of application No. 16/457,921, filed on Jun. 28, 2019, now abandoned.

(51) Int. Cl.
*A47B 96/00* (2006.01)
*F16B 11/00* (2006.01)

(52) U.S. Cl.
CPC ............ *A47B 96/00* (2013.01); *F16B 11/006* (2013.01)

(58) Field of Classification Search
CPC ....... A47B 96/00; F16B 11/006; F25D 23/04; F25D 23/028; F25D 25/02
USPC .............. 312/321.5, 405.1, 245, 242; 108/42
See application file for complete search history.

(56) References Cited

U.S. PATENT DOCUMENTS

| 723,964 | A | 3/1903 | Wilson | |
| 1,035,015 | A | 8/1912 | Johnson | |
| 1,485,714 | A | 3/1924 | Roach | |
| 1,543,980 | A | 6/1925 | Blood | |
| 1,707,013 | A * | 3/1929 | Hoegger | A47B 67/02 312/242 |
| 1,898,922 | A * | 2/1933 | West | F25D 17/04 62/377 |

(Continued)

FOREIGN PATENT DOCUMENTS

| JP | 07225078 | 8/1995 |
| JP | 2002034677 | 2/2002 |
| JP | 2011027324 | 2/2011 |

OTHER PUBLICATIONS

Command 4lb Capacity Caddy, Decorate Damage-Free (HOM15CLR-ES). Available at https://www.amazon.com/dp/B0084M695G/ref=emc_b_5_t. (Accessed Mar. 12, 2018).

(Continued)

*Primary Examiner* — Janet M Wilkens

(57) ABSTRACT

A cabinet organizer attaching to the interior surface of a cabinet door providing a low profile. An organizer utilizing a critical, predetermined dimension range and construction based specifically on the gap generated within a cabinet between the cabinet door recessed panel, the cabinet face frame, and adjacent shelving contained therein when the cabinet is closed. A cabinet organizer accounting for the spatial limitations and considerations of this defined gap/space along the interior surface of the cabinet door when the cabinet door is closed as to substantially fit in this gap and not substantially protrude into the shelving storage space, yet provide enough room to accommodate a variety and/or multitude of articles of interest for storage within a variety of cabinets made with this construction. An organizer utilizing a critical, predetermined balance in dimensions and construction for storage space practicality purposes.

12 Claims, 19 Drawing Sheets

(56) References Cited

U.S. PATENT DOCUMENTS

| | | | | |
|---|---|---|---|---|
| 1,941,126 | A | * | 12/1933 | Blackman ............... A47B 67/02 |
| | | | | 312/329 |
| 1,980,730 | A | | 11/1934 | Matchette |
| 2,122,336 | A | | 6/1938 | Berry |
| 2,230,975 | A | | 2/1941 | Gratz |
| 2,349,391 | A | | 5/1944 | Usoskin |
| 2,528,807 | A | | 11/1950 | Whitney |
| 2,562,056 | A | * | 7/1951 | Norberg ................. F25D 23/04 |
| | | | | 312/405.1 |
| 2,917,355 | A | | 12/1959 | Squire |
| 3,095,249 | A | * | 6/1963 | Albrecht ................. A47K 5/02 |
| | | | | 312/242 |
| 3,182,809 | A | | 5/1965 | Getoor |
| 3,295,474 | A | | 1/1967 | Omstein |
| 4,123,130 | A | * | 10/1978 | Locke .................. A47B 49/004 |
| | | | | 312/236 |
| 4,378,070 | A | | 3/1983 | Matheis |
| D300,795 | S | | 4/1989 | Kellogg |
| 5,046,696 | A | | 9/1991 | Lee |
| D334,533 | S | | 4/1993 | Brunner |
| D365,239 | S | | 12/1995 | Emery |
| 5,486,044 | A | | 1/1996 | Bennet |
| 5,782,544 | A | | 7/1998 | Johnson, Sr. |
| 6,113,201 | A | | 9/2000 | Bauer |
| 6,131,864 | A | | 10/2000 | Schumann |
| D458,640 | S | | 6/2002 | Hofman |
| 6,464,086 | B1 | | 10/2002 | Klein |
| D487,845 | S | | 3/2004 | Johansson |
| D495,929 | S | | 9/2004 | Clarson |
| 7,118,001 | B2 | | 10/2006 | Klein |
| 7,204,569 | B2 | | 4/2007 | Walburn |
| D548,282 | S | | 8/2007 | Chen |
| D554,419 | S | | 11/2007 | Thompson |
| D563,138 | S | | 3/2008 | Kramer |
| D568,116 | S | | 5/2008 | Goodman |
| D577,913 | S | | 10/2008 | Thompson |
| 7,481,014 | B2 | | 1/2009 | Milburn |
| D602,530 | S | | 10/2009 | Thompson |
| 7,631,770 | B2 | | 12/2009 | Martin |
| 7,802,766 | B2 | | 9/2010 | Thompson |
| D628,385 | S | | 12/2010 | Klein |
| 7,854,817 | B2 | | 12/2010 | Thompson |
| D652,684 | S | | 1/2012 | Herrera |
| 8,113,608 | B2 | | 2/2012 | Tassin |
| D679,528 | S | | 4/2013 | Gilboe |
| D691,657 | S | | 10/2013 | Hu |
| 8,746,818 | B2 | | 6/2014 | Mease |
| D718,054 | S | | 11/2014 | Goodman |
| 8,979,054 | B2 | | 3/2015 | Thompson |
| D731,187 | S | | 6/2015 | Thompson |
| 9,345,321 | B1 | | 5/2016 | Yennie |
| D779,231 | S | | 2/2017 | Pan |
| D779,232 | S | | 2/2017 | Pan |
| D781,069 | S | | 3/2017 | Marshall |
| D808,742 | S | | 1/2018 | Lee |
| 2001/0028022 | A1 | | 10/2001 | Hamerski |
| 2004/0007549 | A1 | | 1/2004 | Klein |
| 2004/0020883 | A1 | | 2/2004 | Brokaw |
| 2005/0011219 | A1 | | 1/2005 | Asan |
| 2006/0138291 | A1 | | 6/2006 | Cles |
| 2007/0102601 | A1 | | 5/2007 | Thompson |
| 2007/0257165 | A1 | | 11/2007 | Newbould |
| 2008/0053931 | A1 | | 3/2008 | Newbouild |
| 2008/0053932 | A1 | | 3/2008 | Newbould |
| 2008/0053935 | A1 | | 3/2008 | Newbouild |
| 2008/0283481 | A1 | | 11/2008 | Evans |
| 2010/0270246 | A1 | | 10/2010 | Rodriguez |
| 2011/0300272 | A1 | * | 12/2011 | Smario ................. F25D 23/12 |
| | | | | 426/243 |
| 2014/0183079 | A1 | | 7/2014 | Brawn |
| 2016/0069606 | A1 | | 3/2016 | Baumann |

OTHER PUBLICATIONS

Command Medium Caddy, Indoor Use (HOM14CLR-ES). Available at https://www.amazon.com/dp/B0084M698S/ref=emc_b_5_t. (Accessed Mar. 12, 2018).

Command Caddy, Small, 1 caddy, 2 strips, Organize Damage-Free (HOM16CLR-ES). Available at https://www.amazon.com/dp/B0064M6A1Y/ref-emc_b_5_t. (Accessed Apr. 5, 2019).

Command Clear Smart Phone Station, 1 caddy, 2 strips, Station, Decorate Damage-Free (HOM17CLR-ES). Available at https://www.amazon.com/dp/B0084M69YW/ref=emc_b_5_t. (Accessed Apr. 5, 2019).

Command Wall and Cabinet Organizer, Satin Nickel, 1-Orgnizer (BATH37-SN-ES). Available at https://www.amazon.com/dp/B01C60CAYU/ref=emc_b_5_t. (Accessed Apr. 5, 2019).

Command FBA_BATH31-SN-ES Shower, Satin Nickel, 1-Caddy. 1-Prep Wipe, 4-Large Water-Resistant Strips (BATH31-SN-ES). Available at https://www.amazon.com/dp/B01C60C4TQ/ref=psdc_2422451011_t1_B00HDFXD90. (Accessed Apr. 5, 2019).

Command Shower Water-Resistant, Clear Frosted, 1 Caddy, 4 Strips (BATH1.1-ES), 4.8×11.3×6. Available at https://www.amazon.com/Command-Shower-Water-Resistant-Frosted-BATH11-ES/dp/B00HDFXD90?ref_=ast_sto_dp. (Accessed Apr. 5, 2019).

Command Under Sink Cabinet Caddy, 1 caddy, 4 strips, Holds 7.5 lbs. White (17604-HWES). Available at https://www.amazon.com/Command-Under-Cabinet-1-Caddy-17604-HWES/dp/B071RCDGBQ?ref_=ast_sto_dp. (Accessed Apr. 5, 2019).

Door Storage 2 Trays With Screw-In Clips Sink & Base Accessories. Available at https://www.rev-8-shelf.com/p-193-door-storage-2-rays-with-screw-in-clips-sink-and-base-accessories.aspx. (Accessed Apr. 6, 2019).

Door Storage Single Tray With Screw-In Clips Sink & Base Accessories. Available at https://www.rev-a-shelf.com/p-201-door-storage-single-tray-with-screw-in-clips-sink-and-base-accessories.aspx. (Accessed Apr. 6, 2019).

Flor Slezak, Organizing Under the Kitchen Sink—Organize With Sandy : Organize With Sandy, Pinterest.com, Retrieved at https://www.pinterest.com/pin/551620654331257691/?ip=true. (Accessed Apr. 7, 2019).

Pantry Ideas—DIY Door Spice Rack, Shanty-2-Chic.com, Published Oct. 15, 2012, Retrieved at https://www.shanty-2-chic.com/2012/10/pantry-ideas-door-spice-rack.html. (Accessed Apr. 7, 2019).

Ashley, The Less Mess Project: Pantry Reveal!. DomesticImperfection. com, Published Feb. 6, 2012, Retrieved at https://www.domesticimperfection.com/less-mess-project-pantry-reveal/. (Accessed Apr. 7, 2019).

Silver Mesh Drawer Organizers. Available at https://www.containerstore.com/s/office/desktop-collections/silver-mesh-drawer-organizers/12d?productid=10000148. (Accessed May 23, 2020).

Door Mount Wood Spice Rack. Available at https://www.rtacabinetstore.com/RTA-Kitchen-Cabinet-Storage-Solutions/spice-racks/door-mount-wood-spice-rack/. (Accessed Apr. 6, 2019).

IDesign Cabinet Shelf, Available at https://www.idesignlivesimply.com/product/cabinet-shelf-2/. (Accessed May 5, 2019).

Spicy•Shelf Deluxe Stackable Shelf. Available at https://www.bedbathandbeyond.com/store/product/spicy-shelf-deluxe-stackable-shelf/1061661540. (Accessed May 7, 2019).

IDesign Affixx Adhesive Organizer Bins. Available at https://www.containerstore.com/s/kitchen/pantry-organizers/idesign-affixx-adhesive-organizer-bins/12d?productId=1 1005611. (Accessed Apr. 5, 2019).

Apsoonsell Wal Mount Storage Organizer Box for Phone Remote Control Holder. Available at https://www.amazon.com/dp/B071DWDS1S/ref=sspa_dk_detail_0?pd . . . CZhY3Rpb249Y2xpY2tSZWRpcmVjdCZkb05vdExvZ0NsaWNrPXRydWU&th=1. (Accessed May 23, 2020).

Rev-A-Shell White. Polymer Tip Out In-Cabinet Sink Front Trays and Hinges. Available at https://www.homedepot.com/p/Rev-A-Shelf-3-8125-in-H-x-14-in-W-x-2-125-in-D-White-Polymer-Tip-Out-In-Cabinet-Sink-Front-Trays-and-Hinges-6572-14-11-52/202855798. (Accessed May 23, 2020).

(56) References Cited

OTHER PUBLICATIONS

Design Ideas Mesh Magnet Bin (Large: Silver). Available at https://shop.designideas.net/product/meshmagnet-bin-largesilver. (Accessed Sep. 17, 2020).

* cited by examiner

LOW PROFILE CABINET ORGANIZER

BACKGROUND

The present disclosure relates to cabinet organizers, and more particularly, to cabinet organizers that are mounted to the interior surface of the cabinet door.

Cabinets have long been used for storing a multitude of articles, yet have a finite amount storage space available. To help utilize this finite space as much as possible, there have typically been two methods used: various initial designs have been built into cabinets, and various independent organizers. As an example, initial designs include shelves built into the initial design of the cabinet to help with storage utilization in a cabinet. Independent organizers are typically developed and manufactured separately from the cabinet. These independent organizers are generally made to be compatible with a variety of cabinets. As well, independent organizers come in a variety of designs, materials, and methods for storage based on what particular type of article the organizer is intended to store, or by what space the organizer plans to utilize in the cabinet. With regards to an organizer designed for a particular type of article, one such example would be the Spicy Shelf® spice rack available from Edgy Shelf Products (Mapleton, Utah), designed for storing spice containers. With regards to targeting a particular space, one space of consideration would be the space in-between the original shelves of cabinet itself, referred to as shelving storage space. One such example of an organizer targeting this particular area would be the Idesign® cabinet shelf available from InterDesign (Solon, Ohio), designed to utilize more of the shelving storage space.

One group of independent organizers focuses on using the interior surface of the cabinet door to increase the availability of storage space, while typically improving ease of accessibility to the articles contained therein. These organizers come in a variety of shapes and methods of attachment. One method of attachment commonly referred to as "over-the-door" or "over-door" racks are described for example in U.S. Pat. No. 20040007549 and U.S. Pat. No. 7,118,001, typically hanging on the door using hanger brackets of some sort. These types of organizers allow for storage using the interior surface of a cabinet door, among other areas utilized for storage, such as a closet. These organizers generally prevent marring of the cabinet door as found with some other methods described further in the ensuing disclosure. However, these over-door racks typically allow for part of the hanging brackets to be exposed on the exterior surface of the cabinet door, being visible when the cabinet is closed. This can be aesthetically undesirable. As well, many of these organizers are fixed with limited adjustability, such as with the distance of the hangers to the storage components of the organizer. This can prevent adjustability for arrangement such as that potentially desired to complement the shelving within the cabinet. For example, if an over-door storage system was used in a cabinet with shelves, an adjustable storage receptacle (e.g., basket, caddy, etc.) of the over-door organizer may incidentally be positioned at the same level as a shelf in the cabinet, and may come in contact with that shelf. This could ultimately hinder the cabinet form completely closing when the organizer is mounted. Furthermore, these organizers typically do not account for the limited amount of space along the interior surface of the cabinet door typically found in cabinets comprising a face frame. These organizers generally protrude substantially into the shelving storage space of cabinets where shelving is adjacent to the face frame of the cabinet.

Other organizers that use the interior surface of the cabinet door utilize a direct method of attachment to the interior cabinet surface. This direct attachment allows for a variety of placement options of the organizer on the cabinet door, contributing to the versatility of organizer placement. This can help avoid any potential issues arising, such as the organizer coming in contact with the shelves in the cabinet. This method of attachment also allows for the arrangement of multiple direct-attachment organizers based on the available space on the interior surface of the cabinet. This can ultimately contribute to more space being utilized on the interior surface of the cabinet door for storage. One method of direct-attachment typically uses mechanical fasteners (e.g., nails or screws) as taught, for example in U.S. Pat. No. 2,122,336. While providing a permanent fixture of the organizer onto the cabinet door, this method of attachment leaves permanent holes in the cabinet door. This may be aesthetically undesirable if the organizer was to be removed or adjusted. However, this direct attachment method does provide security of organizer from detaching from the door, such as potentially can occur with the second option typically used for direct attachment.

The second direct-attachment method involves using double-sided adhesive to directly attach the organizer to the cabinet door. For example, this attachment method is utilized by the Command® line of caddies available from 3M Company (St. Paul, Minn.), or the Affixx® line of caddies available from InterDesign (Solon, Ohio), and are widely known in the art. This method of direct attachment typically provides a damage-free method of attaching the organizer versus mechanical fixation. Typically, these adhesive-mounted organizers can be easily attached or removed from the cabinet door as well. Based on these properties, adhesively-mounted organizers provide an option for temporary use. This can be beneficial if using in a temporary residence, such as an apartment. However, in some instances, the adhesive may wear over time and lose the ability to hold the organizer to the cabinet door. The organizer hold's effectiveness and longevity using double-sided adhesive can be influenced by the quality of the adhesive strip used. In many instances, more than one strip may be applied, or a longer piece of adhesive may be used to help with the adherence effectiveness and longevity. This effectiveness can also depend on the size, dimensions, and weight of the adhesively-mounted organizer in combination with the overall weight of articles being stored in the organizer itself. Furthermore, these organizers typically do not account the limited amount of space along the interior surface of the cabinet door typically found in cabinets comprising a face frame. These organizers generally protrude substantially into the shelving storage space of cabinets where shelving is adjacent to the face frame of the cabinet.

A variety of direct-attachment organizers may use mechanical fixation or double-sided adhesive strips in combination with a coupling mechanism of attachment using a separate mounting plate, as taught for example in U.S. Pat. No. 8,979,054. The mounting plate serves as an intermediate structure between the storage device component of the organizer and the cabinet door. With these types of organizers, the mounting plate has a complimentary bracket to a bracket on the storage portion of the organizer configured to releasably engage from one-another, with some mechanisms utilizing a snap-fit connection as the engagement feature. The mounting plate portion of the organizer attaches to the cabinet door typically via the mechanical fasteners or the double-sided adhesive. One such example is the door storage trays available from Rev-A-Shelf (Jeffersontown, Ky.) using mechanical fixation of the mounting plate to the cabinet door. Other mounting plate mechanisms may comprise of a "hook" provided on one side of the mounting plate, with the storage device configured to receive or "hang" on the hooks provided by multiple mounting plates. With the hook provided on one side of the mounting plate, the other side of the mounting plate is adapted to use double-sided adhesive to attach the entire assembly to the cabinet door.

With regards to these variations of organizers that utilize the interior surface of the cabinet door using a direct-attachment such as the Command® line of caddies available from 3M Company (St. Paul, Minn.), or a direct-attachment organizer using mechanical fixation such as the door storage trays available from Rev-A-Shelf (Jeffersontown, Ky.) mentioned previously, these direct-attachment variations can provide adequate storage room for a variety of articles typically found within a cabinet (e.g., spice containers, plastic food and drink storage lids, etc.). However, while these direct-attachment organizers provide more storage space by using the interior surface of the cabinet door, these organizers typically have a rather bulky design which can markedly protrude into the shelving storage space of cabinets where shelving is adjacent to the face frame of the cabinet, and in turn can reduce the shelving storage space available in a cabinet. As well, with cabinets fully-utilizing the shelving storage space (such as a shelf completely filled with drinking cups), a bulky organizer encroaching on the shelving storage space may come in contact with the articles stored within that shelving storage space. This would ultimately inhibit the cabinet door from fully closing as typically desired.

Some organizers may account for the limited amount of space along the interior surface of the cabinet door typically found in cabinets comprising a face frame by utilizing a "slender" design. This slender point of emphasis is known but not prevalent within the art. To note for clarity, the aforementioned "slender" attribute of an organizer relates to the "low profile" attribute, wherein a slenderer organizer equates to a lower profile organizer, further wherein slender refers to the "depth" dimension of the organizer, further wherein the depth is substantially perpendicular to the cabinet door. Thus, it can be reasoned that a lower profile organizer having less depth, protrudes less from the interior surface of the cabinet door. Returning to the defined space within a cabinet, the cabinet comprising a face frame and adjacent shelving, this space is typically defined as the space between the cabinet door, the cabinet face frame, and the shelves contained therein. It is taught, for example, in U.S. Pat. No. 2014/0183079, and U.S. Pat. No. 9,345,321. However, these organizers have to be adequate in size as to adequately accommodate whatever article the organizer is intended to store. U.S. Pat. No. 2014/0183079 teaches a markedly low profile spice organizer system that uses special containers with magnets that stick to a corresponding magnetic backboard, or a polymeric attachment surface holding spice containers to the cabinet door with a complimentary snap-fit connection mechanism. Unfortunately, this system is limited to a specific spice container design either having a metal backing plate complementary to the magnetic backboard, or the shape of the spice container specifically having the complementary snap fit connection to the polymeric attachment surface. While the system teaches an organizer using the interior surface of a cabinet door that does not protrude on shelf space, this system is not only limited to spice containers, but to a specific type of spice containers. This system does not provide adequate storage room for a variety of other articles typically found within a cabinet (e.g., other spice containers, plastic food and drink storage lids, etc.) as well. Furthermore, both of these organizer systems fail to account for key, specific attributes regarding this defined space that allows for accommodating larger organizers to an extent when compared to these two organizer systems mentioned, and in turn allow for storing more potential articles of interest.

Some organizers known in the art inadvertently have this desired low profile such as the designated small size caddy and phone caddy in the Command® line of caddies available from 3M Company (St. Paul, Minn.). However, the overall dimensions of the caddies are not suitable for storing various articles that may be desired to be stored in a kitchen cabinet (e.g., spice containers, plastic food and drink storage lids, etc.) or elsewhere. The small caddy mentioned previously has a desirable depth range. However, this caddy has a length dimension (in which the caddy has a "length" dimension and is formatted to be mounted such that the length is substantially horizontal) that is substantially small, tapering down to under 2.5 inches, and not providing adequate storage space for items typically found within a kitchen cabinet such as those mentioned previously. As well, the smart phone caddy mentioned previously designed for storing smart phones, suffers from having a minimum depth too narrow for storage of the aforementioned articles of interest. While these organizers may be beneficial in certain circumstances outside the scope of cabinet organizing or using the interior surface of a cabinet door for storage, they are not suitable for storing articles of interest that may be desired to be stored within this defined space: such as but not limited to spice containers, food and drink storage lids, and other articles as well.

U.S. Pat. No. 9,345,321 teaches a low profile rack designed to hold food packets. While this low profile rack teaches an organizer using the interior surface of a cabinet door that does not protrude on shelf space, this rack system suffers from a multitude of limiting factors making it not suitable for storing and organizing a variety of articles of interest mentioned prior. For example, the disclosure teaches of a rack storage system with a limiting ledge depth range of approximately 0.5 inches to 0.75 inches used for storage. While this may be appropriate for the desirous effects of storing food packets as described in the disclosure, this desired depth range significantly limits itself in depth for other articles such as the previously-mentioned articles of interest typically found within a cabinet. These articles of interests (e.g., various spice containers, and drink lids) typically have a depth range larger than the aforementioned range of this prior art rack system. As well, this low profile rack system teaches of a system with a plurality of ledges where the ledges are approximately between 3.25 inches and 4 inches apart. This range would ultimately limit it to articles with a height substantially less than this range, and not provide adequate room needed for storing and accessing larger articles such as food container lids that can have a minimum dimension larger than four inches: whether it be the length, width, or diameter depending on the shape and orientation of the lid. This system also teaches of a relatively large organizer in terms of the surface area it takes up on the interior surface of the cabinet door. While this may be beneficial for providing more storage room, this broader size of attachment space needed on the cabinet door limits the versatility of placement of the rack system, versus a single caddy organizer, such as the Command™ line of caddies available from 3M Company (St. Paul, Minn.). This larger surface area of attachment may increase the chances of this rack system coming in contact with the shelves within the cabinet if the depth of the rack is even slightly larger than the depth needed to fit in-between the outer shelf edge facing the cabinet door and interior face of the cabinet door when the cabinet is closed. While a larger depth single caddy organizer may protrude into the cabinet space and take away from the shelving storage space, the organizer would still be able to fit in the cabinet and be able store a variety of articles on the interior surface of the cabinet door nonetheless. Ultimately, while this rack system provides a system that does not protrude on shelf space, the rack system is limited in its design, not accommodating for a variety of articles found within a cabinet mentioned prior, and limited to its placement within the cabinet by the amount of surface area taken up on the cabinet door. For these reasons, a balance in the dimensions should be utilized for an efficient, versatile cabinet organizer. Furthermore, this organizer system fails to account for key, specific attributes regarding this defined space along the interior surface of a cabinet door that can allow for accommodating larger organizers to an extent when compared to this low profile organizer mentioned, and in turn make the organizer more versatile and suitable to store more articles of interest mentioned prior.

In light of the above, a need exists for a new cabinet organizer that directly attaches to the interior surface of the cabinet door. A low profile cabinet organizer accounting for the spatial limitations and considerations of this defined gap/space, in its entirety, along the interior surface of the cabinet door when the cabinet door is closed as to substantially fit in this gap and not substantially protrude into the shelving storage space. An organizer that may substantially fit within this gap, yet provide enough room to accommodate a variety and/or multitude of articles of interest for storage within a variety of cabinets based around a cabinet construction having a face frame; an organizer utilizing a critical, predetermined balance in dimensions and construction for storage space practicality purposes.

SUMMARY

The present invention provides a door-mountable cabinet organizer system. In some embodiments, the cabinet organizer system includes at least one cabinet organizer comprising at least one main body, at least one backing plate, and connection means of the organizer to an interior surface of a cabinet door. The main body may encompass any conceivable shape or construction. In some embodiments, the main body may have a variety of forms such as, but not limited to, a caddy. In some embodiments, the main body has a front side, a rear side, a left side, a right side, and bottom side. The left side extends from the rear side to the front side on one end of the main body, and a right side extends from the rear side to the front side on the opposing end of the main body from the left side. The bottom side extends along the bottom of the front side, the rear side, the left side, and the right side, providing enclosure to the main body from the bottom, wherein the bottom side is a primary shelf for supporting various articles of interest (e.g., spice containers, plastic food and drink storage lids, etc.). The main body provided in some embodiments may be selected from the group consisting of at least one caddy and at least one shelf.

With dimensions of the main body being integral to the functionality of the door-mountable cabinet organizer, the distance between the front side and rear side defines a depth dimension of the main body. The distance between the main body left side and a right side, defines a length dimension of the main body. The main body predetermined depth dimension range is approximately 1.0 inches to 1.82 inches. The main body has a predetermined length dimension of at least approximately 2.75 inches. To note, the term "cabinet organizer" is used interchangeably with the term "low profile organizer", or simply "organizer", for ease of explanation and are not limiting. To note, "door-mountable cabinet organizer system" is used interchangeably with the term "organizer system" or "low profile organizer system" for ease of explanation and are not limiting.

In yet further embodiments, the organizer system includes a cabinet in addition to the low profile organizer. Optionally, the cabinet may include an interior, an exterior, and a cabinet door separating the interior from the exterior, the cabinet door pivotably attached to the cabinet and configured to pivot between an open and a closed position. In some embodiments, the interior may comprise of at least one shelf, wherein the interior is accessible through a cabinet face frame defining a cabinet opening. The shelf includes an outer shelf edge facing the cabinet face frame, wherein the distance from the outer shelf edge to the face frame is at most 0.5 inches. The cabinet door comprises the interior surface facing the cabinet interior, overlaying the face frame when the cabinet door is in the closed position. In some embodiments, the cabinet interior surface has a recessed panel, with the recessed panel centered as to not overlay the face frame of the cabinet while facing the cabinet interior in the closed position. The interior surface of the cabinet door including the recessed panel, the cabinet face frame, and the outer shelf edge define boundaries of a gap generated along the interior surface of the cabinet door when the cabinet is in the closed position.

With regards to the low profile organizer, in some embodiments, at least one backing plate is attached in any arrangement or configuration to an exterior surface of the main body rear side of the organizer. The backing plate configured to confront the interior surface of a cabinet door while serving as an intermediary structure between the main body and the interior surface of the cabinet door. The backing plate is constructed to be used in conjunction with the attachment means to secure the organizer to the cabinet door.

The organizer comprises means for attaching the exterior surface of the rear side of the main body to the interior surface of the cabinet door, specifically on the recessed panel of the interior surface of the cabinet door. To note, when stated hereinafter with regards to the cabinet organizer being secured to the "cabinet door", it is to be understood that the cabinet organizer is secured to the "recessed panel on the interior surface of the cabinet door" for ease of explanation and is not limiting. When the organizer is secured to the cabinet door, in some embodiments, the distance from the front side outer surface to the interior surface of the cabinet door defines a cabinet organizer profile.

In one or more aspects, with this construction and predetermined organizer profile, the low profile organizer can substantially fit within the generated gap along the interior surface of the cabinet door. In one or more aspects, the organizer can as well provide adequate storage room for various articles of interest typically found within a cabinet, yet is slender enough as to not substantially protrude into the shelving storage space—accounting for spatial limitations/considerations of this defined gap along with potential articles of interest to be stored (e.g., spice containers, plastic food and drink storage lids, etc.).

In one or more aspects, the attachment means of the organizer to the interior surface of the cabinet door may include an attachment construction utilizing double-sided adhesive, wherein at least one backing plate is adapted to receive at least one double-sided adhesive. The double-sided adhesive may be configured to be arranged between the backing plate and the cabinet door for securing the storage organizer to the interior surface of the cabinet door. In other embodiments, the backing plate may contain at least one hole for attaching the organizer to the cabinet door using mechanical fixation (e.g., nails, screws, etc.).

In other embodiments, the organizer may utilize a coupling mechanism of attachment in combination with at least one double-sided adhesive for securing the organizer to the cabinet door. The coupling attachment mechanism utilizes at least one separate mounting plate with the mounting plate serving as an intermediary structure between the backing plate attached to the main body, and the cabinet door. At least one coupling bracket or mounting fixture is provided on the backing plate, with the backing plate coupling bracket forming a first engagement feature. At least one mounting plate is included forming a bonding surface and a second engagement feature. The bonding surface is adapted to receive a double-sided adhesive to attach the mounting plate to the cabinet door. The second engagement feature is formed opposite the bonding surface, facing the backing plate. The first and second engagement features have a complimentary construction to each other, configured to provide releasable engagement between the backing plate and the mounting plate. Last, a double-sided adhesive is configured to be arranged between the bonding face of the mounting plate and the cabinet door for securing the organizer to the cabinet door.

In other embodiments, the organizer may utilize a coupling mechanism of attachment in combination with a mechanical fixation mechanism of attachment (e.g., nails, screws, etc.) for attaching the organizer to the organizer door. The construction of attachment utilizes a separate mounting plate with the mounting plate serving as an intermediary structure between the backing plate attached to the main body, and the cabinet door. At least one coupling bracket or mounting fixture is provided on the backing plate with the backing plate coupling bracket forming a first engagement feature. At least one mounting plate provides the second engagement feature and has at least one hole. The first and second engagement features have a complimentary construction to each other, configured to provide releasable engagement between the backing plate and the mounting plate. The hole on the mounting plate may be used for mechanically fixating (using nails, screws, etc.) the mounting plate to the cabinet door, with the main body and backing plate connected to the mounting plate—ultimately securing the organizer to the cabinet door.

In other embodiments, the organizer may not include a backing plate attached to the main body. In these embodiments, the organizer includes a main body and means of attaching the main body to the cabinet door. Such embodiments may utilize similar means of attachment to interior surface of the cabinet door as mentioned previously, with some differences.

In one or more embodiments, the rear side may have the exterior surface of the rear side adapted to directly receive at least one double-sided adhesive, with at least one double-sided adhesive configured to be arranged between the rear side of the storage device and the cabinet door for securing the storage organizer to the cabinet door. In other embodiments, the rear side of the main body may contain at least one hole for securing the organizer to the cabinet door using mechanical fixation (e.g., nails, screws, etc.).

In other embodiments not including at least one backing plate, the organizer may utilize a coupling, releasable engagement mechanism of attachment in combination with at least one double-sided adhesive. The construction of attachment utilizes a separate mounting plate with the mounting plate serving as an intermediary structure between the main body, and the interior surface of the cabinet door. At least one coupling bracket is provided on the exterior surface of the rear side of the main body, forming a first engagement feature. At least one mounting plate is included, forming a bonding face and a second engagement feature, wherein the bonding face is adapted to receive a double-sided adhesive to attach the mounting plate to the cabinet door. The second engagement feature is formed opposite the bonding face, facing the exterior surface of the rear side of the main body. Each of the first and second engagement features have a complimentary construction to each other, configured to provide releasable engagement between the main body and the mounting plate. A double-sided adhesive is configured to be arranged between the bonding face of the mounting plate and the cabinet door for securing the cabinet organizer to the cabinet door.

In other embodiments with regards to the cabinet organizer not including at least one backing plate, the organizer may utilize a coupling mechanism of attachment in combination with a mechanical fixation mechanism of attachment (e.g., nails, screws, etc.) for attaching the organizer to the cabinet door. The mechanism of attachment utilizes a separate mounting plate with the mounting plate serving as an intermediary structure between the main body and the cabinet door. At least one coupling bracket is provided on the exterior surface of the rear side of the main body, forming a first engagement feature. At least one mounting plate forms the second engagement feature and has at least one hole. Each of the first and second engagement features have a complimentary construction to each other, configured to provide releasable engagement between the main body and the mounting plate. The hole on the mounting plate may be used for mechanically fixating (using nails, screws, etc.) the storage organizer to the interior surface of the cabinet door.

DETAILED DESCRIPTION

Figure 1A:
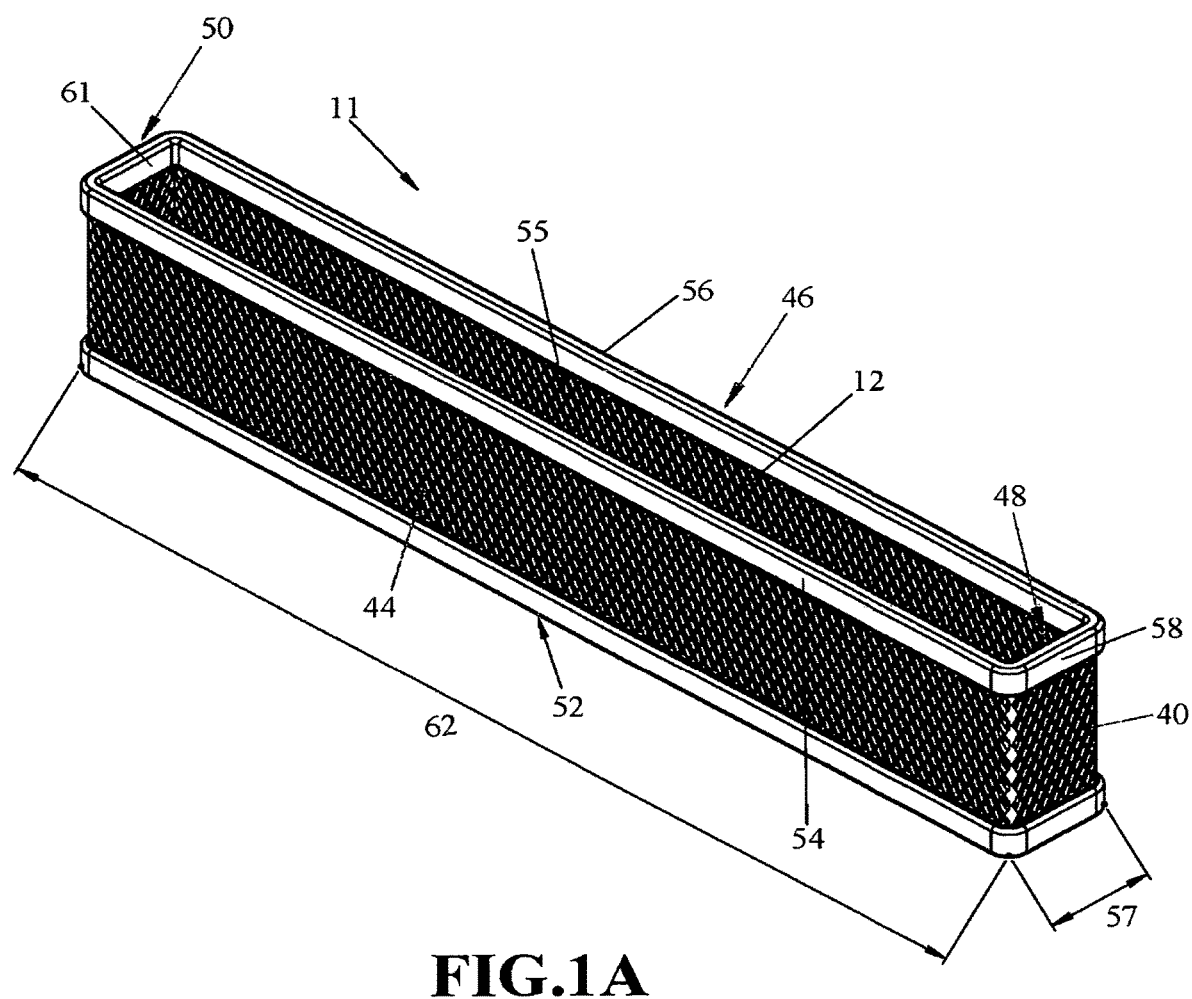
FIG. 1A is a front, perspective view of a low profile cabinet organizer in accordance with principles of the present disclosure, an embodiment with a main body comprised of a metal mesh framework, and backing plates adapted for using double-sided adhesive as attachment means.

With reference to the drawings and the illustrative embodiments depicted therein, the present disclosure provides a door-mountable cabinet organizer system 10. To note, "door-mountable cabinet organizer system" 10 is used interchangeably with the term "organizer system" 10, "cabinet organizer system" 10, or "low profile organizer system" 10 for ease of explanation and are not limiting. Referring to FIGS. 1A-9, in some embodiments, the organizer system 10 includes at least one cabinet organizer 11. The organizer 11 includes at least one main body 12, at least one backing plate 14, and means for attaching 16, 18, 20, 22 the backing plate 14 to an interior surface 24 of a cabinet door 26 of a cabinet 28. To note, the term "cabinet organizer" 11 is used interchangeably with the term "low profile organizer" 11, or simply "organizer" 11 for ease of explanation and are not limiting.

The main body 12 may encompass any conceivable shape or construction, and can be made out of any desired material or combination of materials, so long as it is configured to provide the desired storage and/or organizational attributes according to the principles made clear below. For example, with reference to shapes and construction, the main body 12 may be configured generally in the shape of a caddy as in FIGS. 1A-3A, FIGS. 4-5A, and FIGS. 6A-9, shaped to store and/or organize various articles of interest generally found within a cabinet 28 such as articles depicted in FIGS. 10A-E as examples (e.g., spice containers 30, 31, food 32, 34 and drink storage lids 36, etc.). With regards to any desired material or combination of materials, as an example, the main body 12 may comprise of a generally solid construction such as plastic, as shown in shown in FIG. 8. Optionally, a solid structure main body 12 may have one or more perforations (e.g. for residual water drainage and substantially more air flow if the organizer 11 is used for storing articles that may have been washed, such as lids). As another example, the main body 12 may comprise a metal mesh framework 40 as depicted in FIGS. 1A-3A, FIG. 5A, FIGS. 6A-7, and FIG. 9. In yet other embodiments, the main body 12 may comprise a wire-rod structure 42 such as that depicted in FIG. 4, or a wire basket structure. Optionally, in some embodiments of the organizing system 10, more than one organizer 11 may be attached to the interior surface 24 of the cabinet door 26 as depicted in FIG. 6B. As mentioned previously, in some embodiments the organizer 11 may comprise of multiple main bodies 12 as depicted in FIG. 9.

Figure 1B:
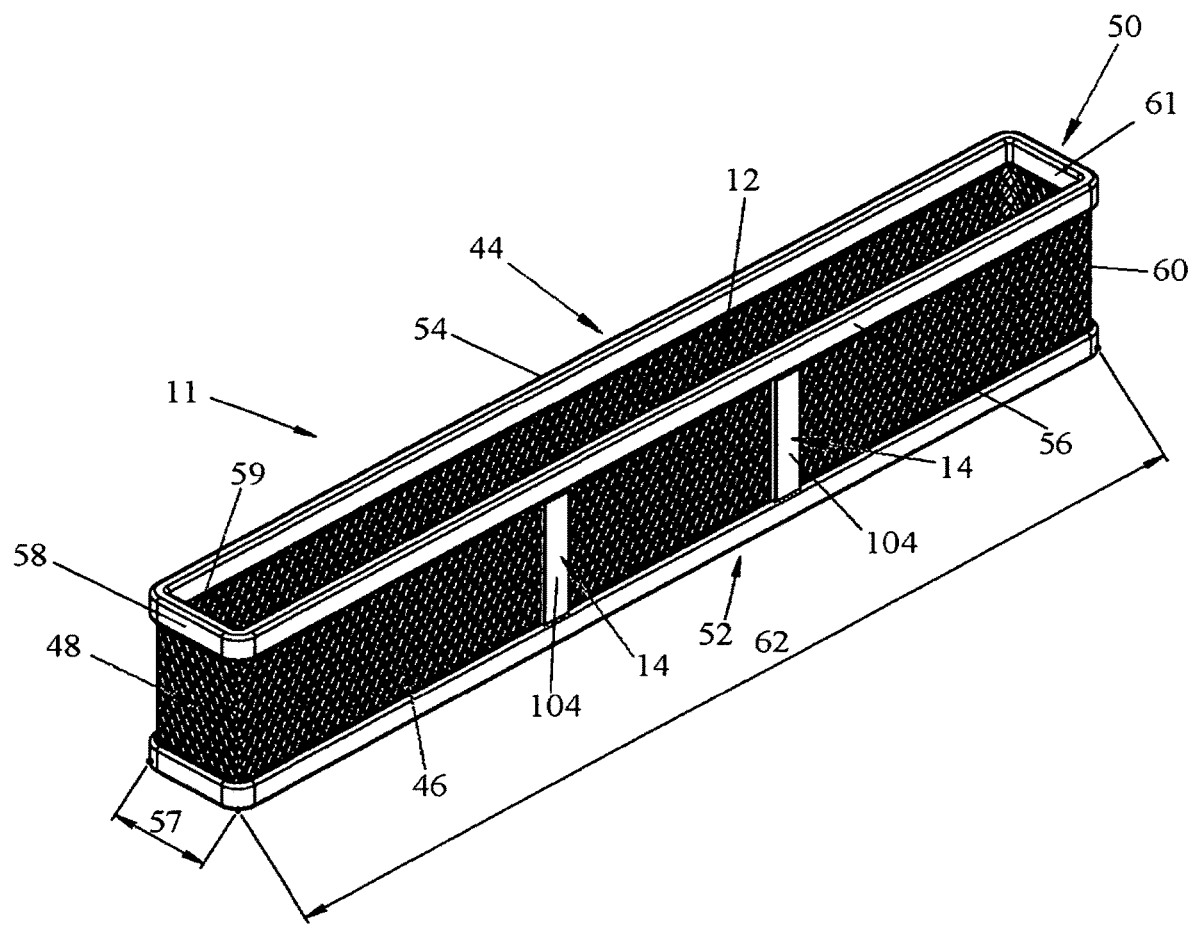
FIG. 1B is a rear perspective view of the low profile cabinet organizer of FIG. 1A.
Figure 2:
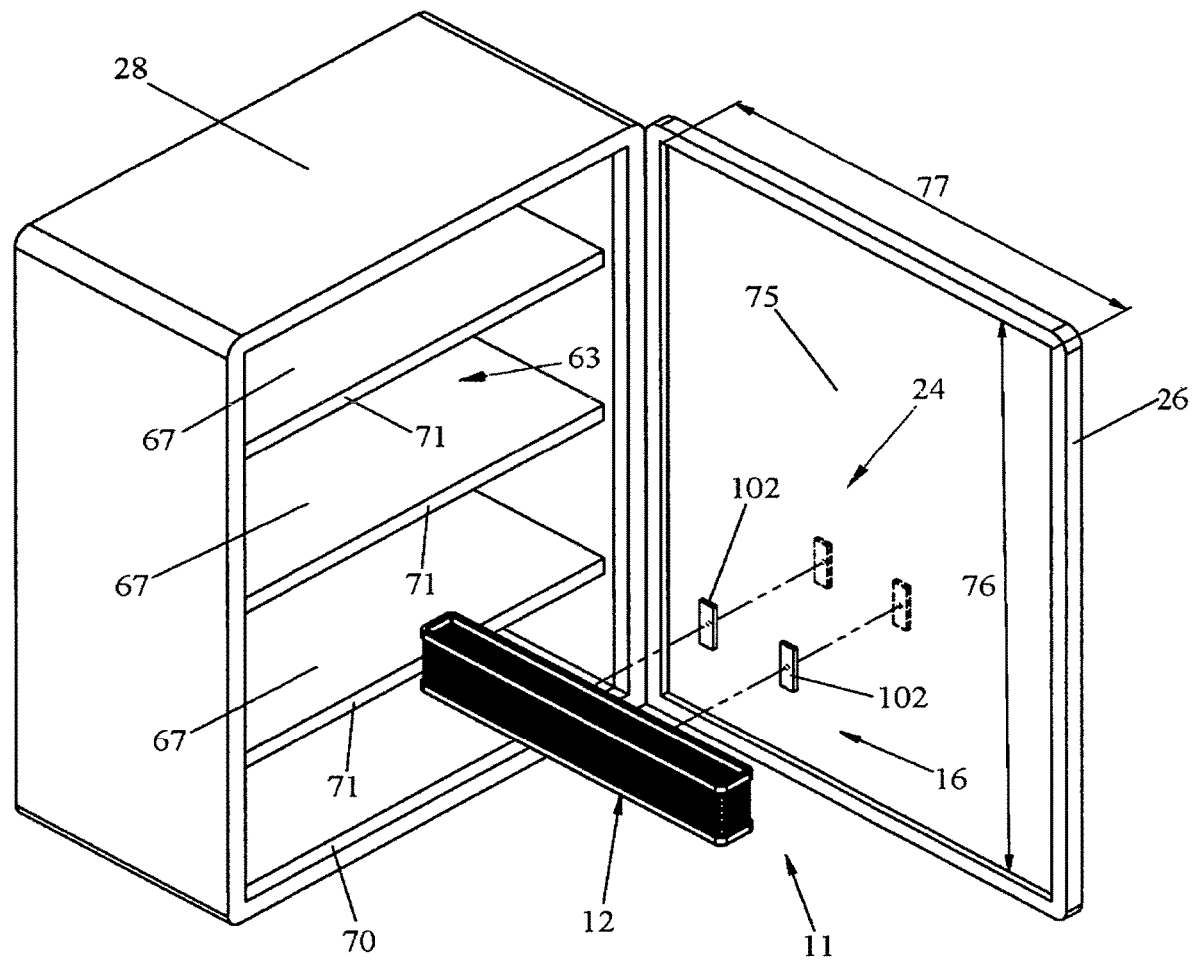
FIG. 2 is a perspective, exploded view of the storage organizer embodiment of FIG. 1A, with means of attachment using double-sided adhesive for securing the organizer to an interior surface of a cabinet door.

The main body 12 may have any conceivable shape or construction. References are made towards a general shape of an embodiment for purposes of clarifying certain dimensions, orientation purposes, and to fully disclose the organizer system 10 for one skilled in the art. In some embodiments, the main body 12 may have a front side 44, a rear side 46, a left side 48, a right side 50, and a bottom side 52 as best shown in FIGS. 1A-B. The main body 12 front side 44 and rear side 46 oppose each other. The front side 44 includes an outer surface 54 opposing the rear side 46. The rear side 46 includes an interior surface 55 facing the front side 44, an exterior surface 56 facing an opposing direction of the interior surface 55 of the rear side 46. A main body depth dimension 57 defines the distance from the rear side exterior surface 56 to the front side outer surface 54.

The main body 12 left side 48 extends from the rear side 46 to the front side 44 on one end of the main body 12, and the right side 50 extends from the rear side 46 to the front side 44 on the opposing end of the main body 12 from the left side 48. The left side 48 comprises an outer surface 58 opposing the right side 50 and an interior surface 59 facing the right side 50. The right side 50 comprises an outer surface 60 opposing the left side 48 and an interior surface 61 facing the left side 48. A main body length dimension 62 defines the distance from the left side outer surface 58 to the right side outer surface 60.

Figure 5A:
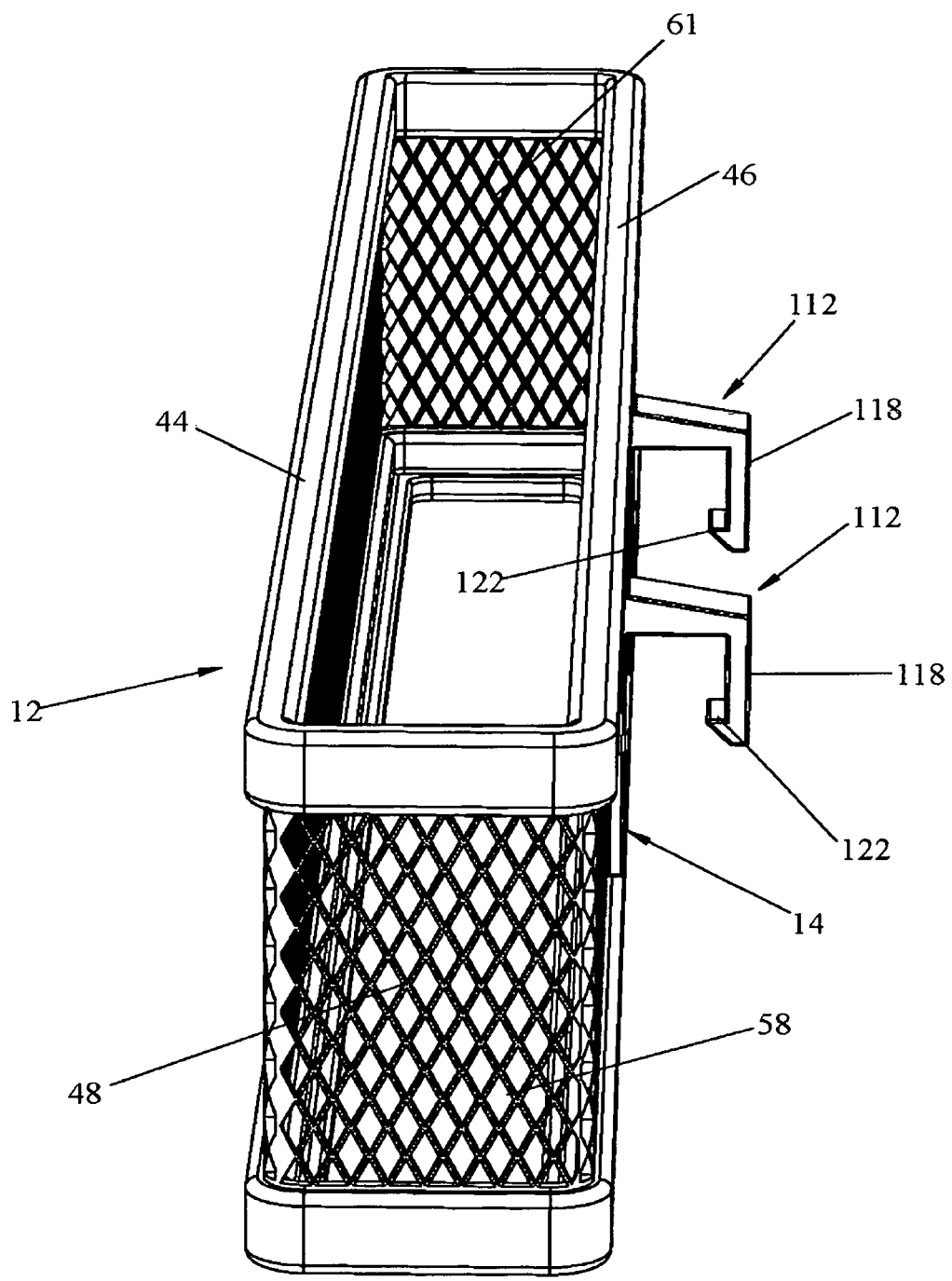
FIG. 5A is left side perspective view of another embodiment of the organizer with means of attachment using a coupling mechanism, intermediate mounting plates, and double-sided adhesive strips for securing the organizer to the cabinet door.
Figure 6A:
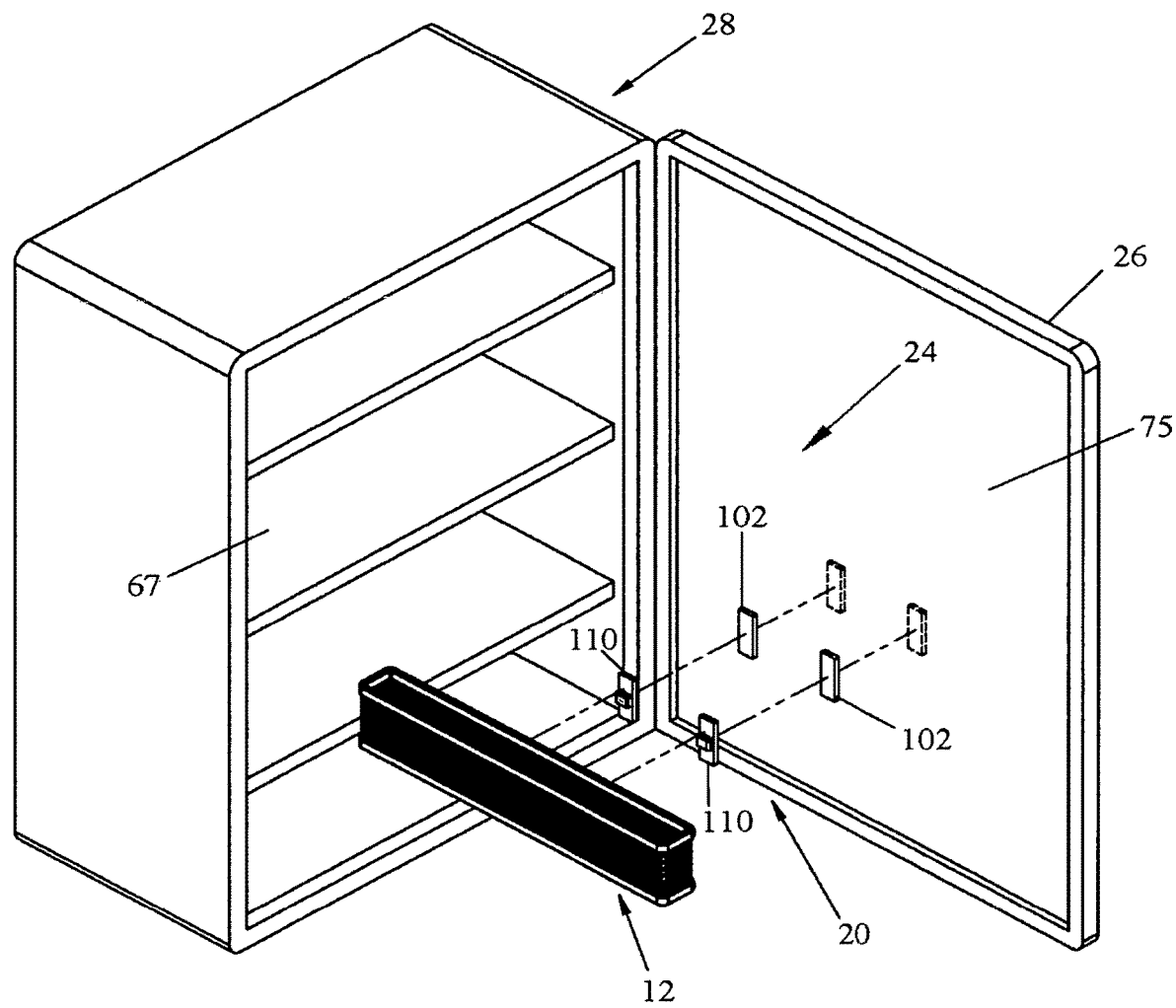
FIG. 6A is a perspective, exploded view of the organizer embodiment of FIG. 5A attaching to the interior surface of the cabinet door.
Figure 6B:
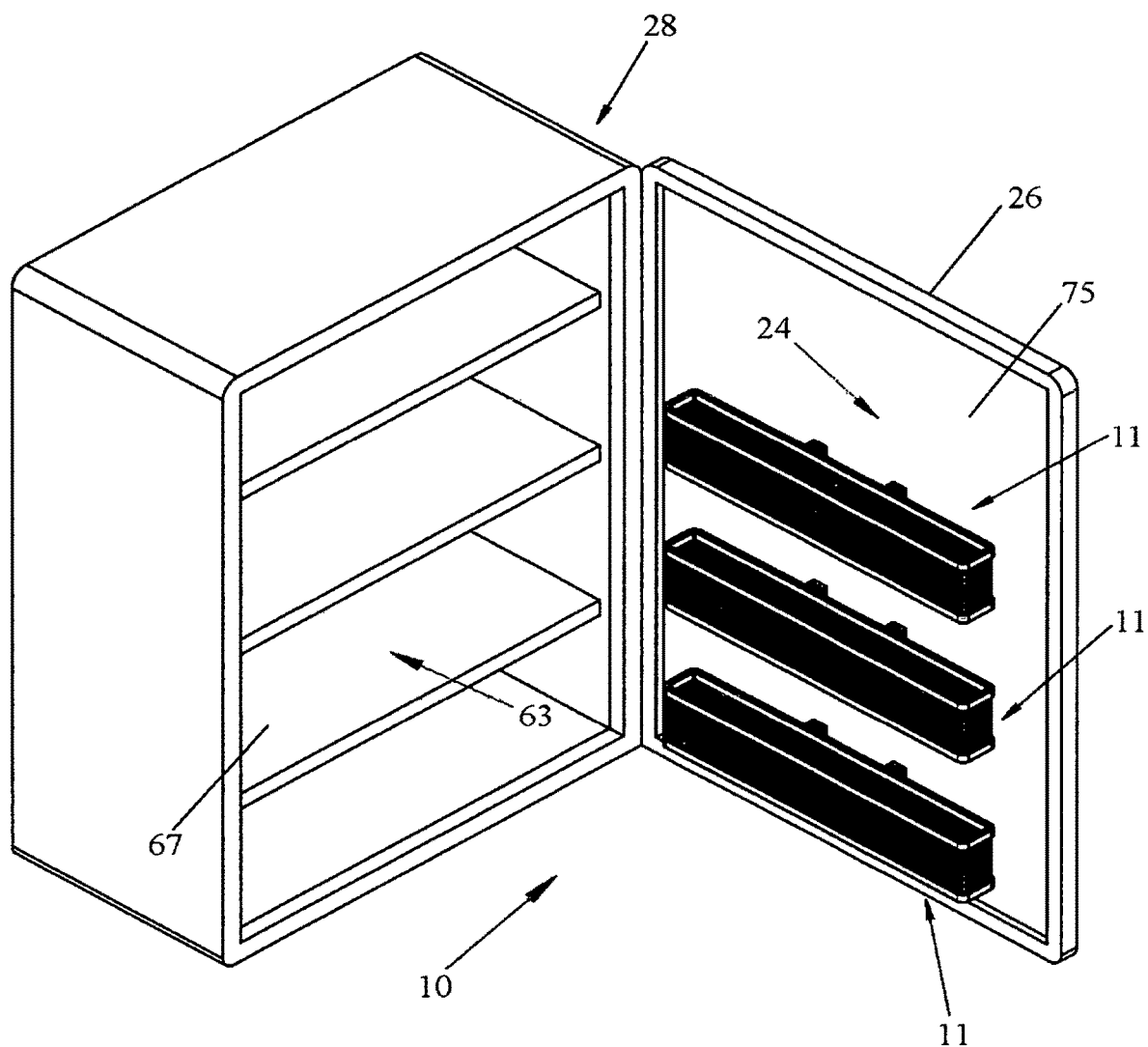
FIG. 6B is a perspective view of multiple organizers in accordance with the embodiment of FIG. 5A attached to the interior surface of the cabinet door.
Figure 7:
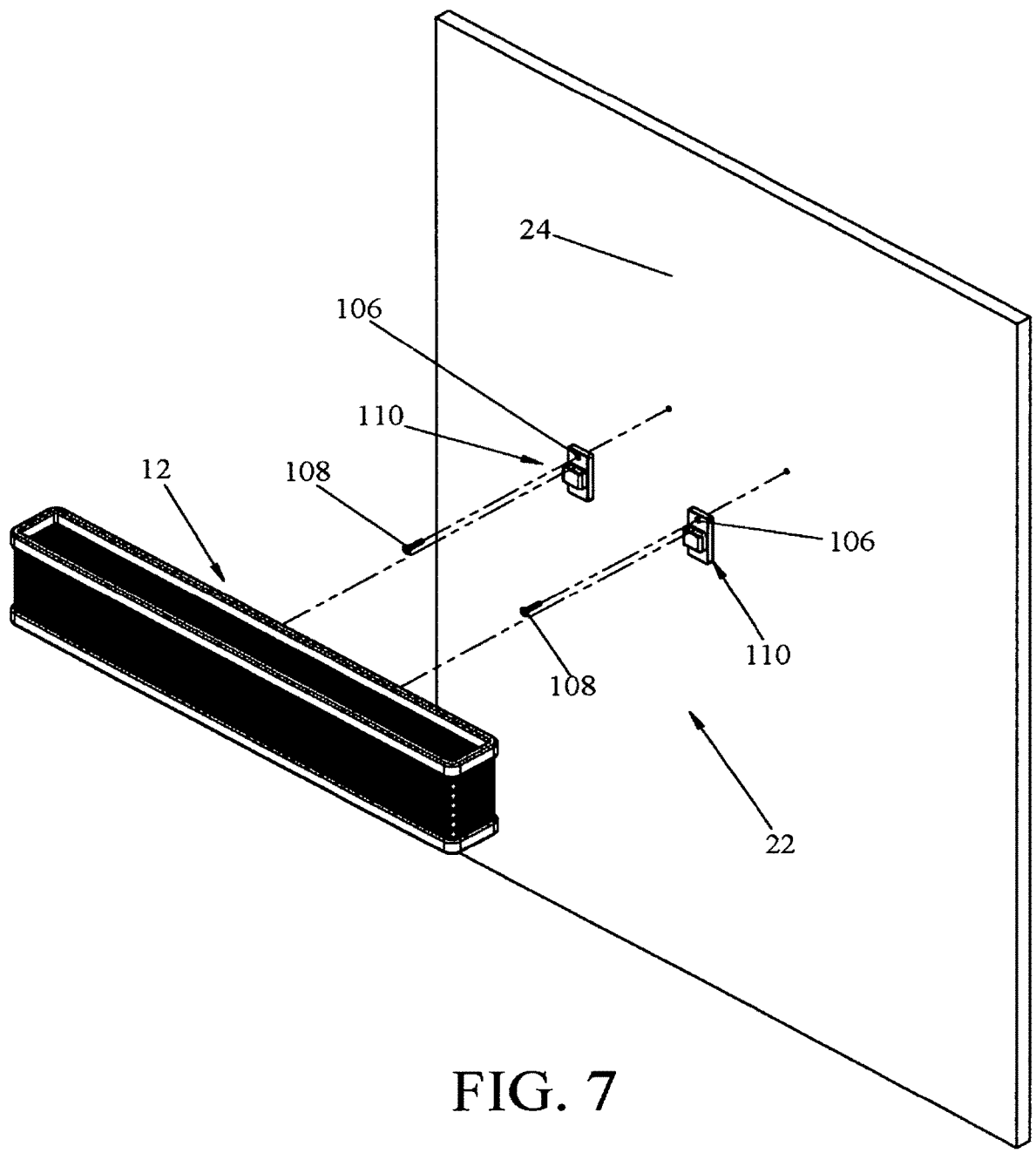
FIG. 7 is a perspective, exploded view of another embodiment of the organizer with means of attachment using a coupling mechanism, intermediate mounting plates, and mechanical fixation of the mounting plates to the cabinet door, ultimately securing the organizer to the cabinet door.

The bottom side 52 extends along the bottom of the front side 44, the rear side 46, the left side 48, and the right side 50, providing enclosure of the front side 44, the rear side 46, the left side 48, and the right side 50 of the main body 12 from the bottom (as depicted in FIG. 5A for example). In some embodiments, the bottom side 52 is shelf for supporting various articles of interest (e.g., spice containers 30, 31, food 32, 34 and drink storage lids 36, etc.).

Figure 8:
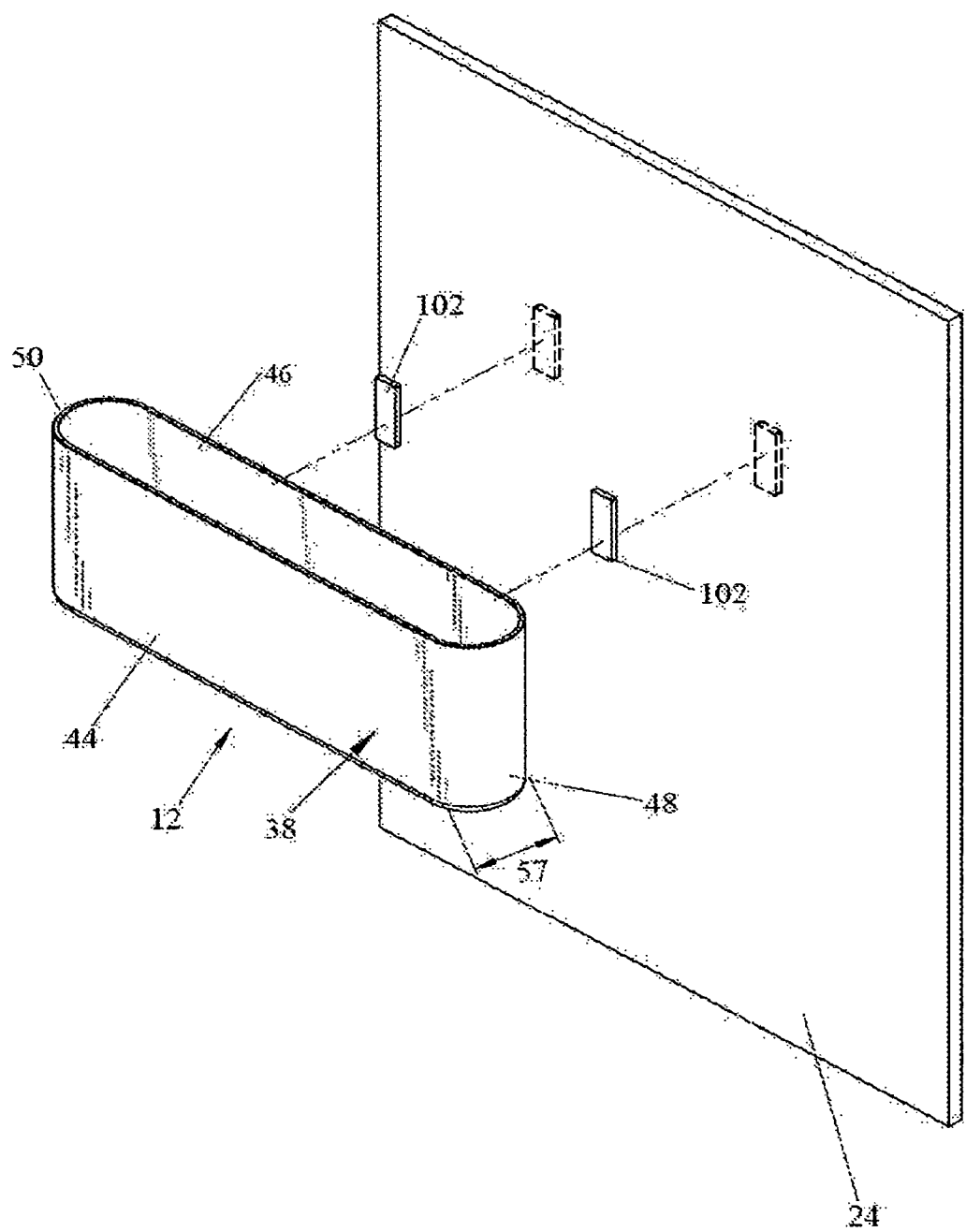
FIG. 8 is a perspective exploded view of another embodiment wherein no backing plate is attached to the main body, with the main body directly adapted to receive double-sided adhesive, using double-sided adhesive as attachment means of the organizer to the interior surface of the cabinet door.
Figure 9:
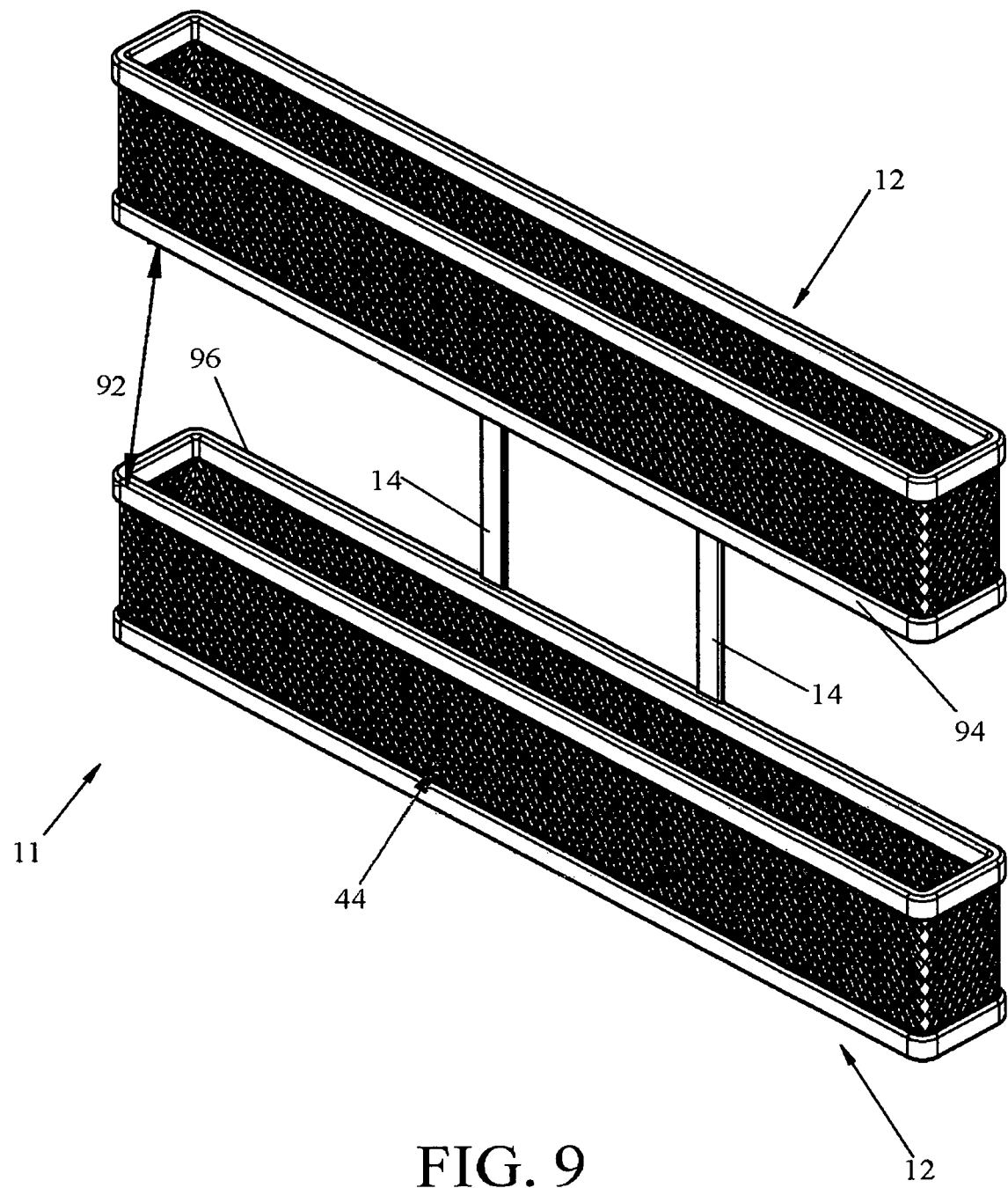
FIG. 9 is a perspective view of an embodiment wherein the organizer includes multiple caddies attached to the same backing plates.

It is to be understood that while a main body 12 construction has been described in some embodiments discussed prior with "sides" defined 44, 46, 48, 50, 52 in some embodiments the main body 12 may not include distinctly-defined edges where one side and another side meet, being able to specifically distinguish one side 44, 46, 48, 50, 52 from another: such as a main body 12 comprised of injection-molded plastic 38, such as depicted in FIG. 8 with the main body 12 having a confluent structure with regards to its sides 44, 46, 48, 50, 52; or to some extent a main body 12 comprised of metal mesh 40 having a cohesive structure with regards to its sides 44, 46, 48, 50, 52, such as that depicted in FIG. 1A; or a main body 12 comprised of wire rods 42 having a cohesive structure with regards to its sides 44, 46, 48, 50, 52. It is to be understood that in these circumstances of main body construction 12, the "sides" 44, 46, 48, 50, 52 are included more-so for the purposes of orientation to one another as generally understood by one skilled in the art and measuring these relatively common dimensions 57, 62, such as describing an embodiment 12 comprising a shape consistent with that in known the art as a caddy (for storing and/or organizing various articles of interest).

While the main body 12 has been described with the aforementioned sides for purposes of orientation and defining dimensions, it will be understood that the main body 12, or sides of the main body 12, may not be limited to a specific shape, curvature, etcetera, as to limit the shape or construction of the main body 12 in its entirety so long as the main body 12 is configured within the critical dimension ranges mentioned prior and further discussed in detail below, while providing the desired storage and/or organizational attributes according to the principles of the present disclosure.

Figure 3A:
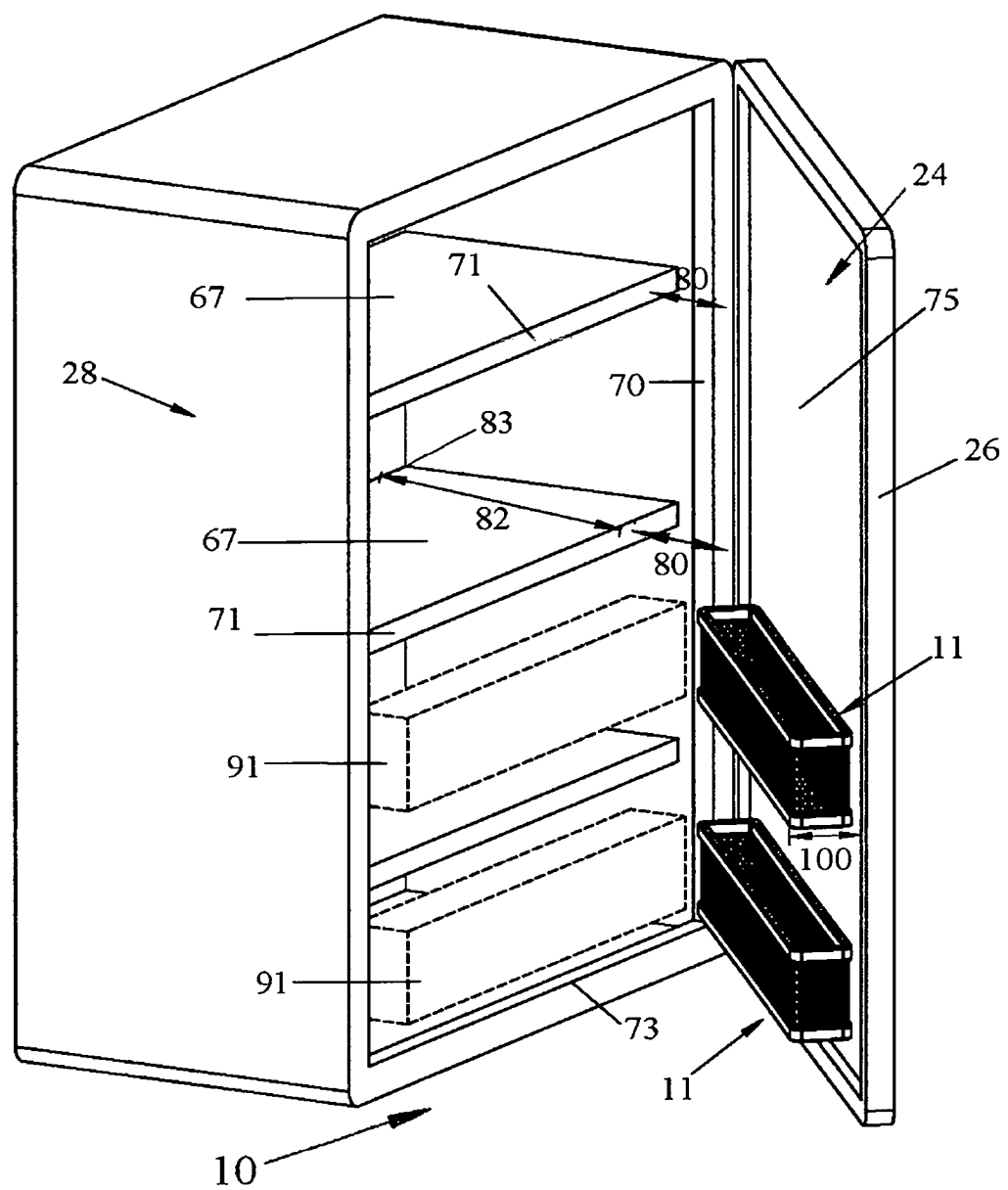
FIG. 3A is a perspective view of a cabinet in an open position, illustrating the defined storage space along the interior surface of the cabinet door used by the organizer, illustrating a profile of where the organizer would be positioned within the cabinet when the cabinet is closed.
Figure 3B:
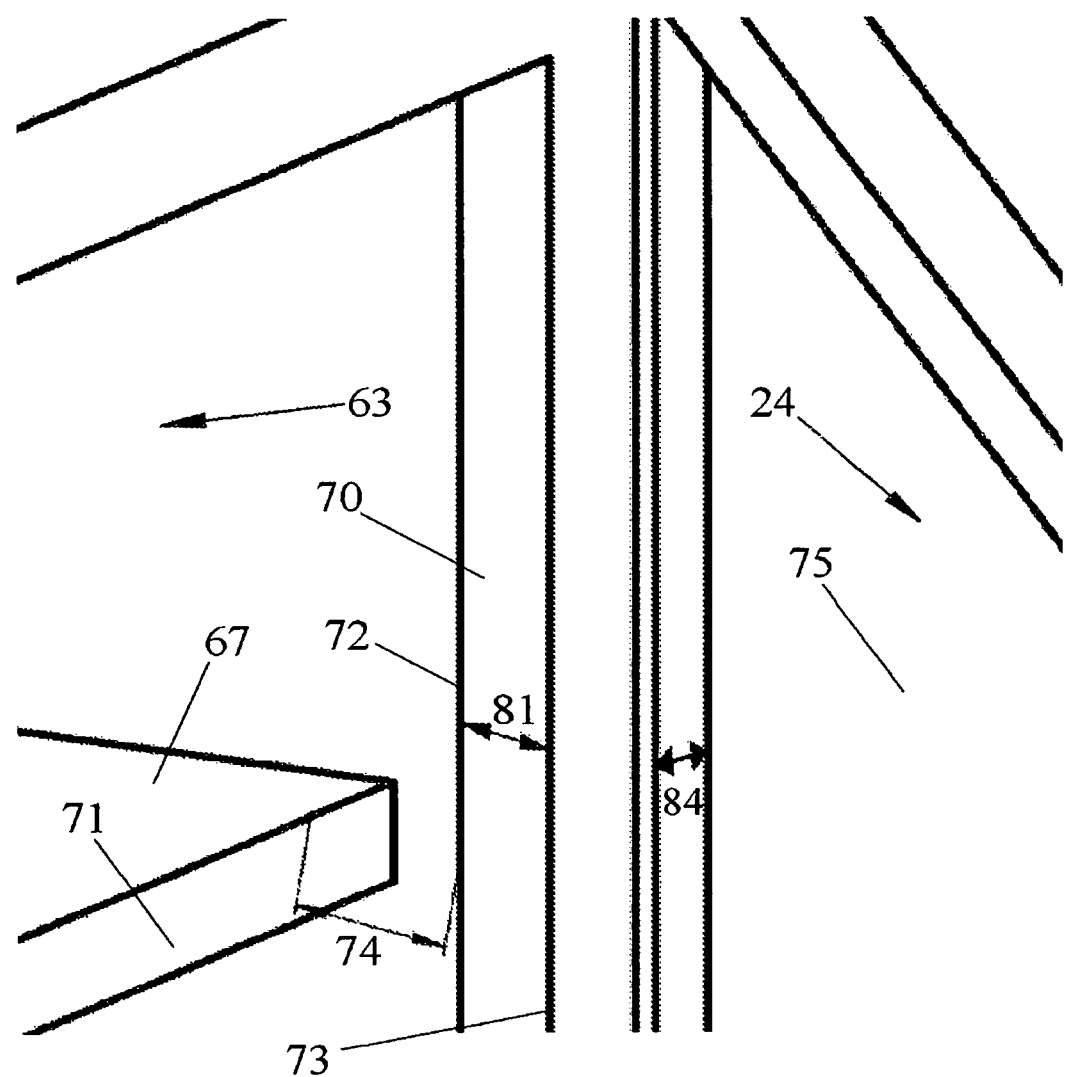
FIG. 3B is an enlarged perspective view of a portion of the cabinet in FIG. 3A where the cabinet door attaches to the cabinet face frame, including specific dimensions pertinent to multiple embodiments.
Figure 11:
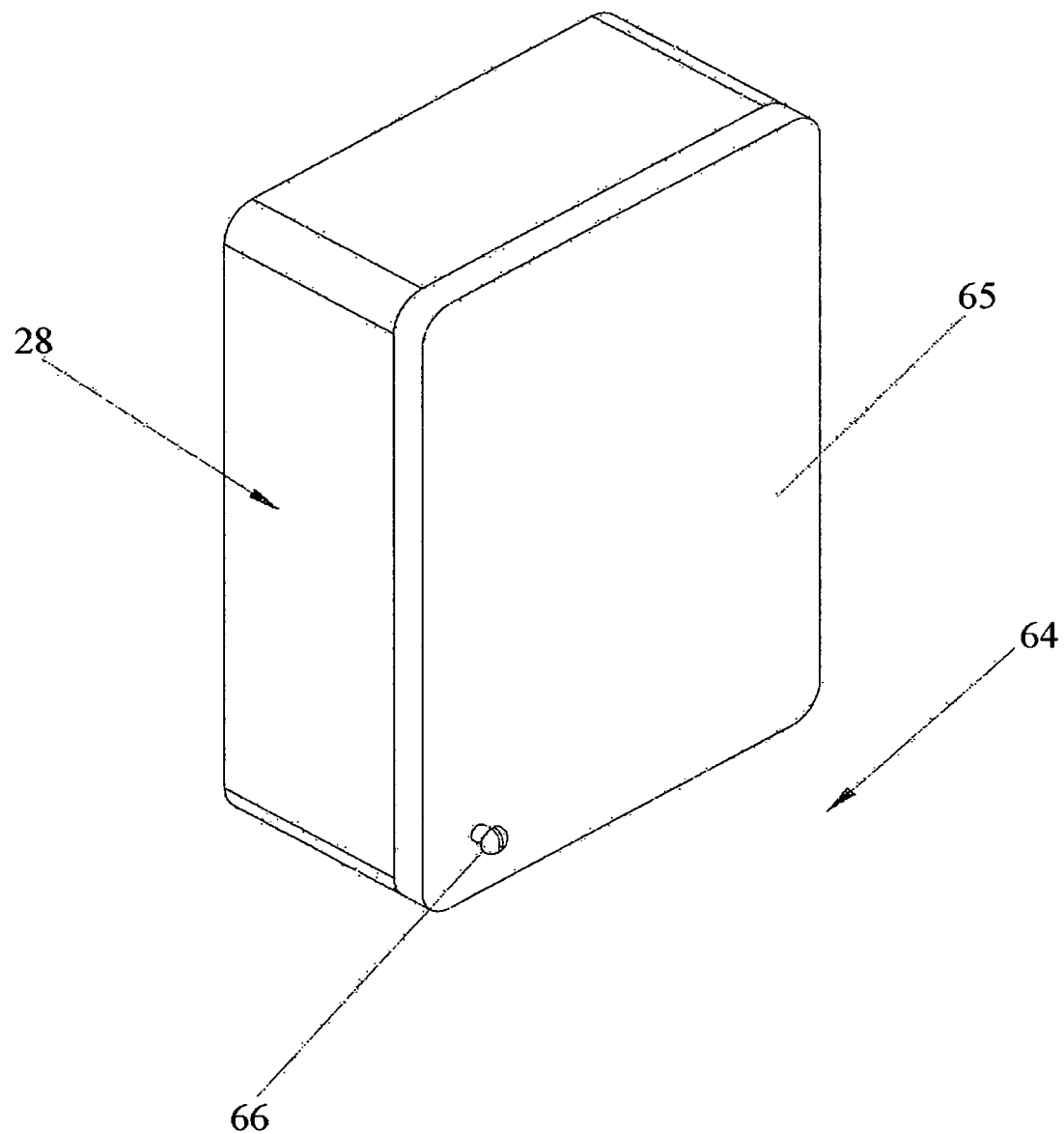
FIG. 11 is a perspective view of a cabinet embodiment in the closed position.

Optionally, the cabinet organizer system 10 can include a cabinet 28 comprising an interior 63, an exterior 64, and a cabinet door 26 separating the interior 63 from the exterior 64, the cabinet door 26 pivotably attached to the cabinet 28 and configured to pivot between an open position depicted in FIG. 3A as example, and a closed position depicted in FIG. 11 as example. Exterior surface 65 of the cabinet door 28 may include a handle 66. In some embodiments, the cabinet interior 63 comprises at least one shelf 67 and is accessible through a cabinet face frame 70 defining a cabinet opening. In some embodiments, the shelf 67 includes an outer shelf edge 71 facing the cabinet face frame 70. The face frame 70 includes an interior edge 72 and exterior edge 73 with a distance 74 from the outer shelf edge 71 to the interior edge 72 of the face frame 70 being at most 0.5 inches, as depicted in FIG. 3B. With regards to the cabinet door 26, the interior surface 24 of the cabinet door 26 may have a recessed panel 75, with the recessed panel 75 typically centered as to not overlay the face frame 70 of the cabinet 28 when the cabinet 28 is in the closed position.

With this cabinet construction, a gap in the cabinet 28 is generated when the cabinet 28 is in the closed position. To note, the term "gap" is used interchangeably with the term "empty gap", or simply "space" for ease of explanation and are not limiting. In some cabinet 28 embodiments, this empty gap may be defined as the space between the interior surface 24 of cabinet door 26, the cabinet face frame 70, and the shelving 67 contained therein. More specifically, in some cabinet embodiments, this gap may be defined as the space between the recessed panel 75 on the interior surface 24 of the cabinet door 26, the cabinet face frame 70, and the outer shelf edge 71 when the cabinet is in the closed position.

More specifically, in some embodiments, the empty gap's specific volume can be defined by the surface area of the recessed panel 75 of the cabinet door 26 (generally defined by the height 76 and width 77 of the recessed panel 75), the distance ("depth") 80 from the outer edge 71 of the shelving 67 facing the cabinet door 26 to the recessed panel 74 of the cabinet door 26 when the cabinet door 26 is closed. This gap depth 80 can be further clarified as the distance from the outer edge of the shelving 71 to the cabinet face frame interior edge 72, combined with the cabinet face frame width 81 from interior face frame edge 72 of the cabinet face frame 70 to the exterior face frame edge 73 of the cabinet face frame 70, combined with the distance from the exterior face frame edge 73 to the recessed panel 75' on the interior surface 24 of the cabinet door 26 when the cabinet door 26 is closed.

While the empty gap includes the surface area of any portion of the interior surface 24 of the cabinet door 26 that does not overlay the face frame 70 when the cabinet 28 is closed, it can be of interest to focus on the surface area which is occupied by the recessed panel 75 in the cabinet door 26, as this recessed panel 75 provides a larger depth 80 dimension of the empty gap by protruding further into the interior surface 24 of the cabinet door 26 towards the exterior 64 of the cabinet 28 when the cabinet 28 is in the closed position.

Optionally, in some embodiments referring to the space provided along the recessed panel 75 portion of the interior surface 24 of the cabinet door 26, this area of the generated gap can vary based on the dimensions of these key components defining the space. For example, this space can vary depending on the surface area available along the recessed panel 75, with larger cabinets 28, in terms of the door 26 size, having more interior door surface area versus cabinets 28 with a smaller door 26 and typically smaller surface area along the interior 24 of that smaller, cabinet door 26. Some cabinets as well have a larger recessed panel 75 surface area occupying more of the interior surface 24 of the cabinet door 26 versus other cabinet doors 26, based on construction preferences of the cabinet door 26. This increased recessed panel 75 surface area would generally equate to more area of the defined space available within the empty gap. As well, the space's depth 80 may be impacted by the relative depth 82 of the interior shelving 67 of the cabinet. It could be reasoned that shelving 67 protruding further towards the cabinet face frame 70 generally equates to less distance from the outer shelf edge 71 to the cabinet face frame 70. This can ultimately provide less depth 80 of the defined storage space. As another example, the width 81 of the face frame 70 may impact the depth 80 of the defined storage space, wherein a face frame 70 that has a larger width 81 generally provides for more depth 80 of the storage space.

With regards to the dimensions of the organizer main body 12, it may be desirous to account for the spatial considerations and limitations of the empty gap available so that the organizer 11 may substantially fit within this empty gap generated when the cabinet door 26 is closed. In some embodiments, this may help the organizer 11 not substantially protrude into the shelving storage space. To note for clarity purposes, shelving storage space may be generally defined as the space made available for storage by the shelving construction 67 within a cabinet 28, and generally has a depth 82 extending from the rear 83 of the shelf 67 to the outer edge 71 of the shelf 67. As well, in some embodiments shelving storage space may be defined as any space within a cabinet 28 not defined by boundaries of the empty gap generated when the cabinet is in the closed position. These boundaries are subject to approximations.

The organizer 11 with principles in accordance with the present disclosure accounts for these dimensions to utilize this empty gap in an efficient manner. While the size of the space may vary considerably based on cabinet construction, cabinet embodiments 28 wherein the outer shelving edge 71 is adjacent to the cabinet face frame 70 interior edge 72, adjacent meaning the outer shelf edge 71 is at most 0.5 inches away from the interior edge 72 of the face frame 70; further wherein the cabinet 28 has a recessed panel 75 wherein the distance 84 the recessed panel 75 is recessed into the interior surface 24 of the cabinet door 26 generally does not exceed 0.4 inches; the total gap depth 80 generally does not exceed 1.82 inches. While these considerations have been noted, it is understood that some cabinets may have variable aforementioned dimensions outside of the given values, such as space depth 80 well over 1.82 inches as in cabinets where the shelving 67 is not adjacent to the face frame 70. In some embodiments, it is to be understood that these prior considerations have been made for the disclosed low profile organizer system 10 to be applicable for a majority of cabinets 28 with this defined construction in relation to shelving 67.

Figure 10A:
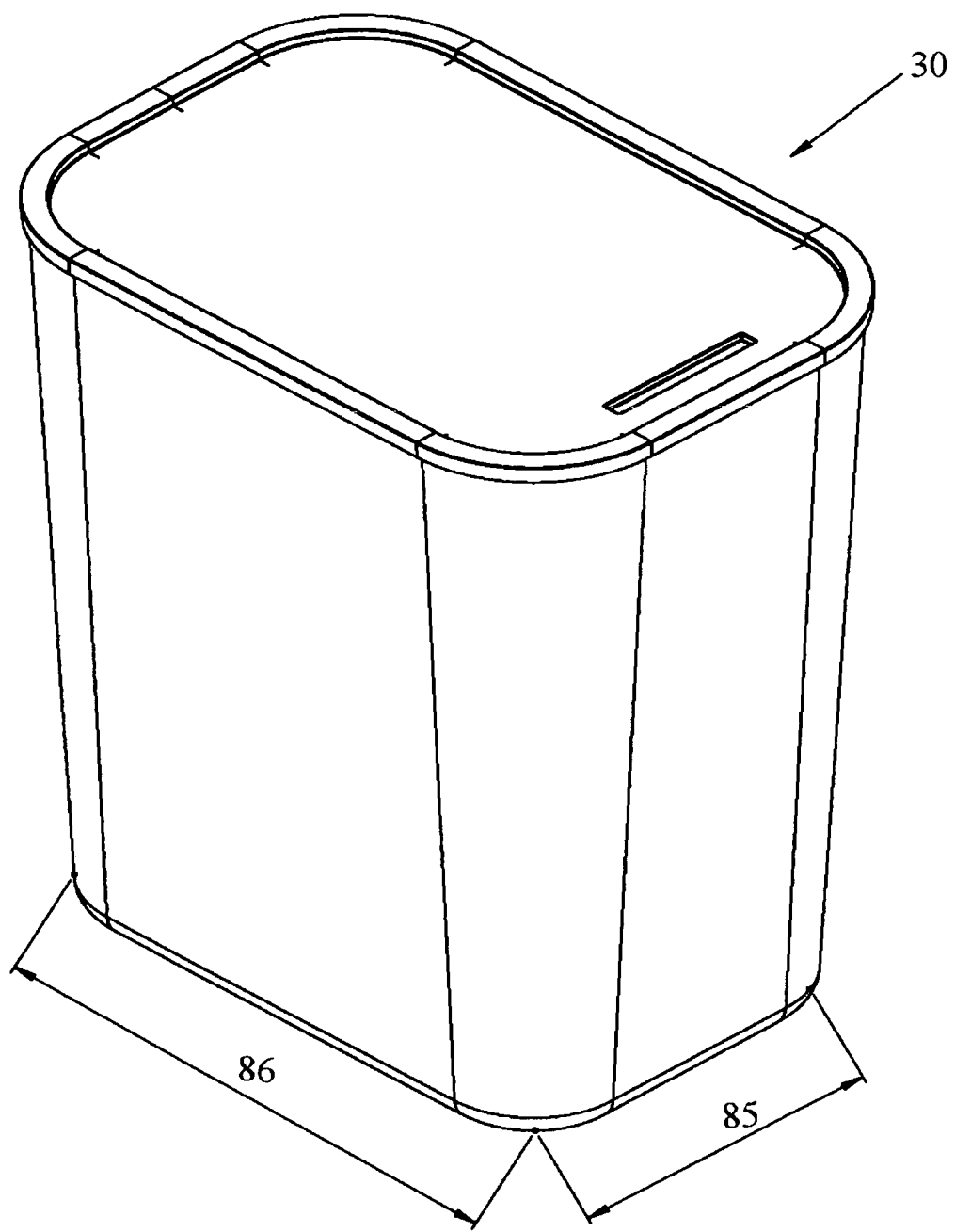
FIG. 10A is a perspective view of an example prism-shaped spice container that may be stored in the organizer.
Figure 10B:
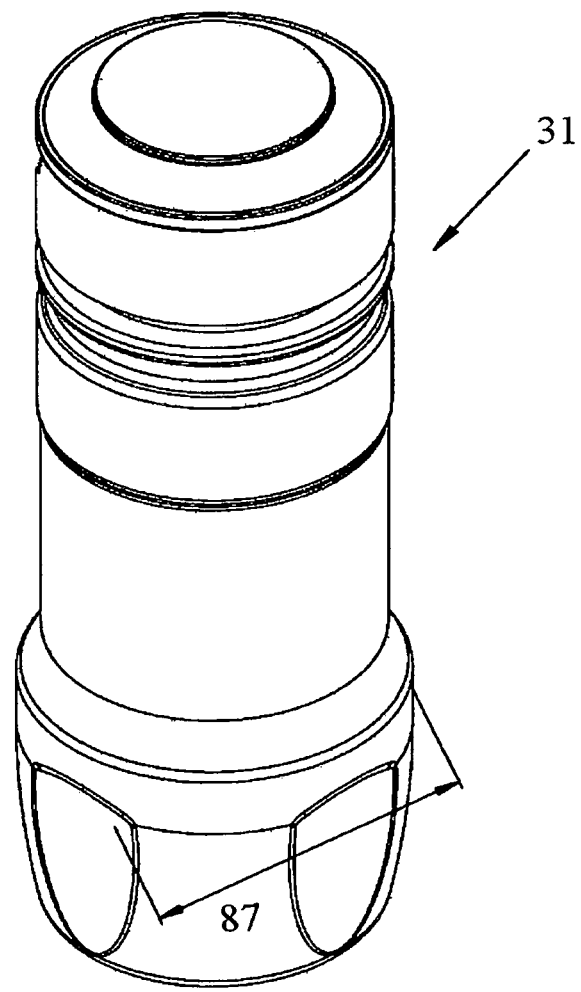
FIG. 10B is a perspective view of an example spice container vial that may be stored in one or more embodiments of the organizer.
Figure 10C:
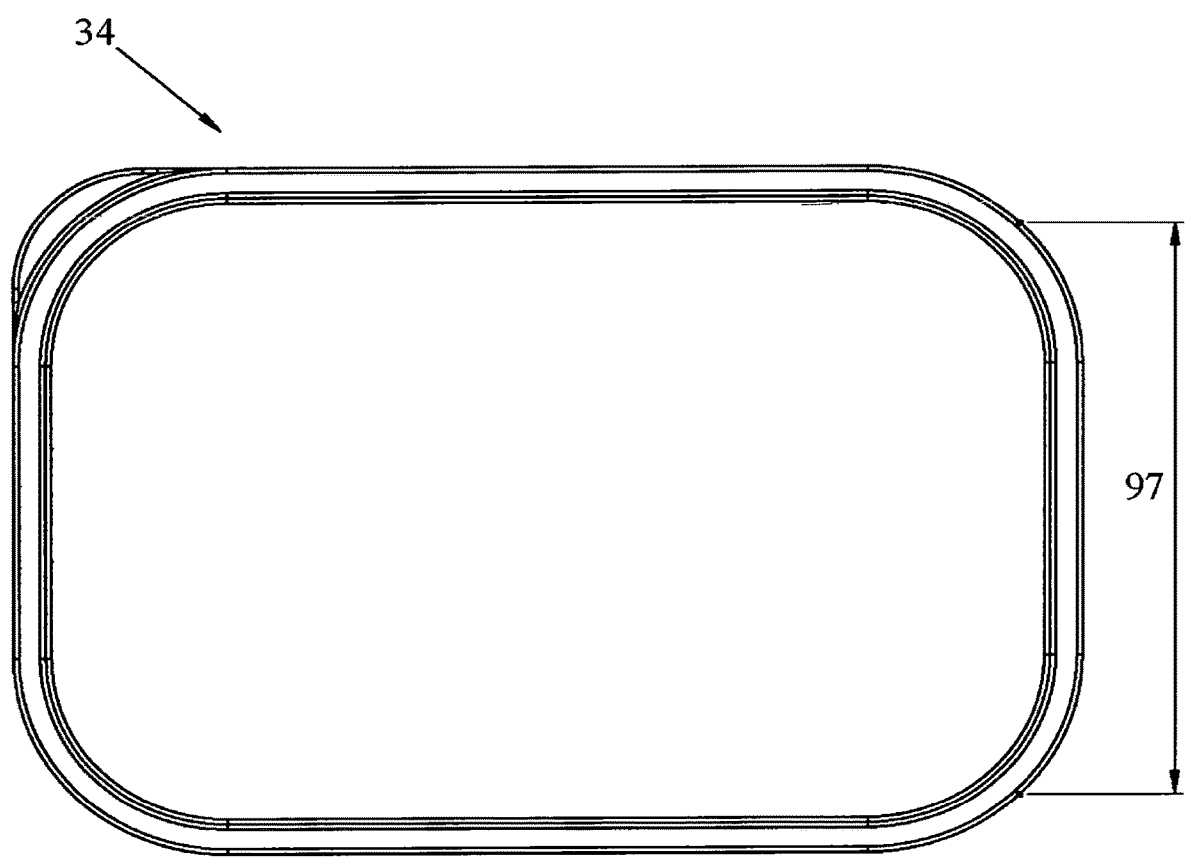
FIG. 10C is a perspective view of an example food storage lid that may be stored in the organizer.
Figure 10D:
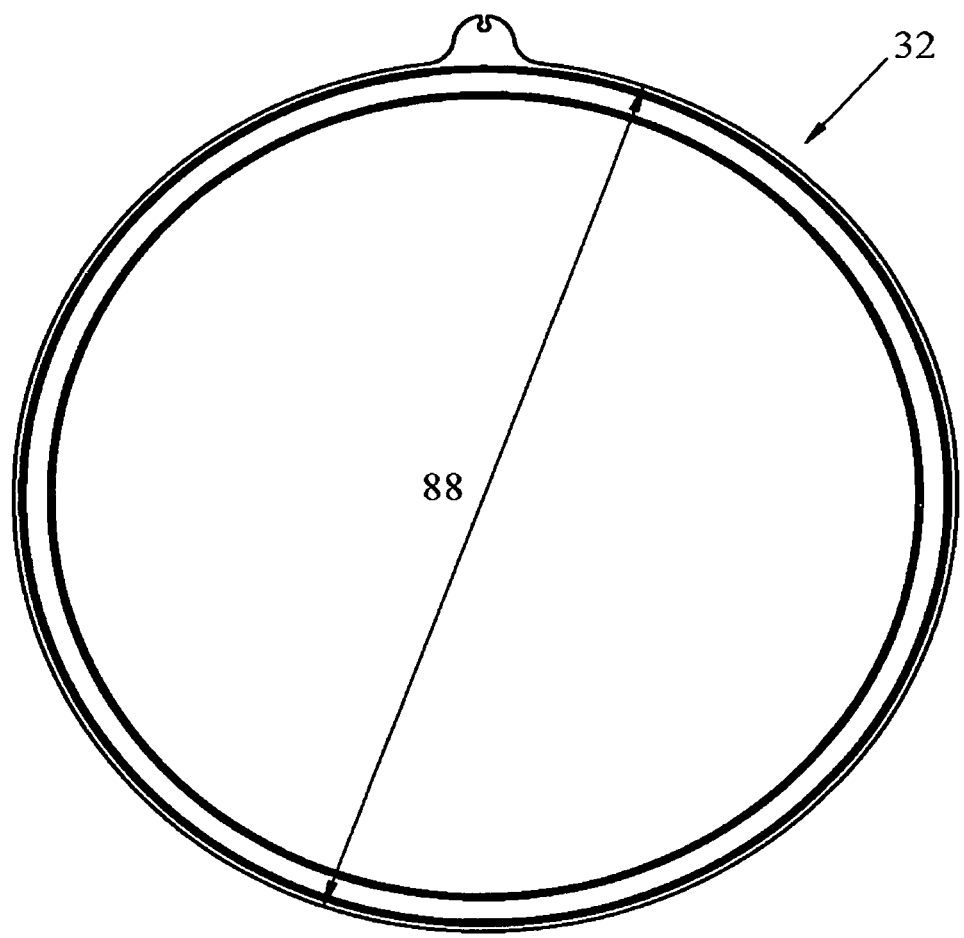
FIG. 10D is a perspective view of another example food storage lid example that may be stored in the organizer.
Figure 10E:
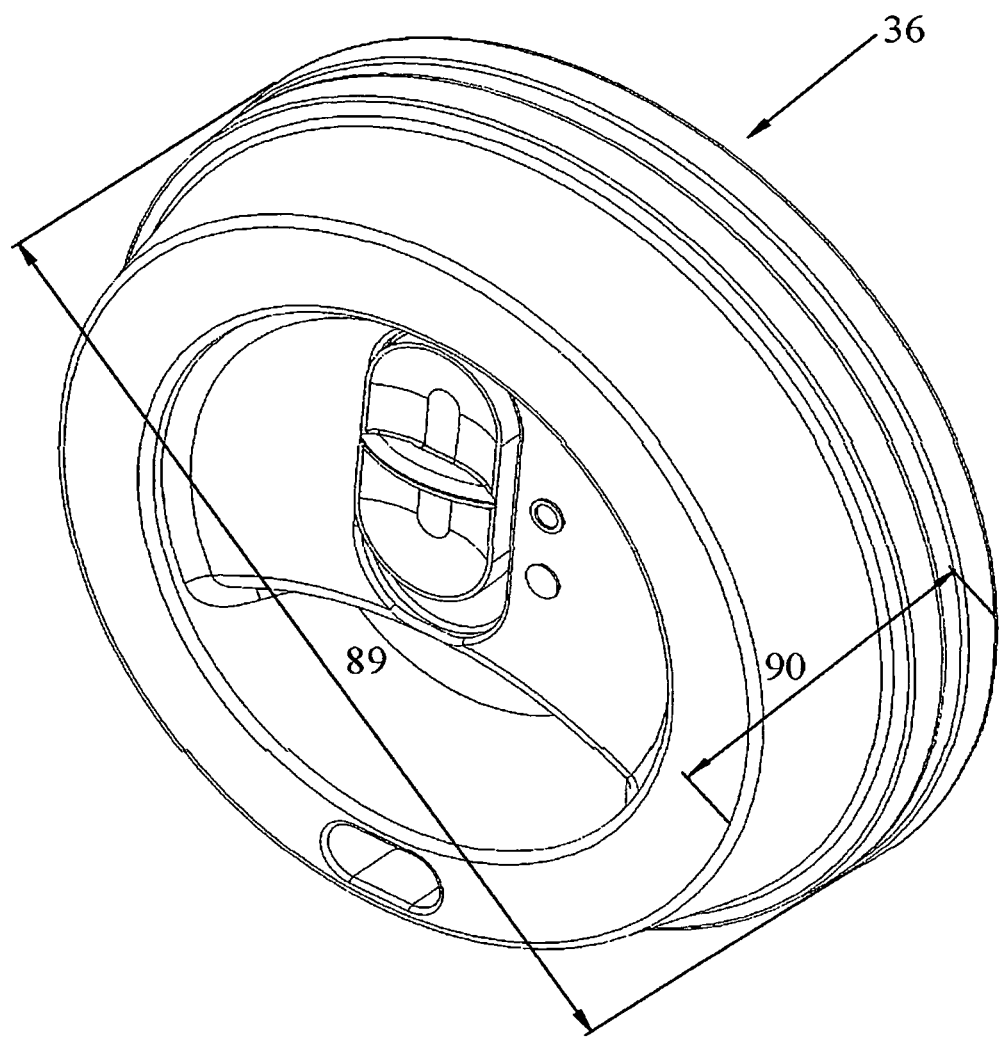
FIG. 10E is a perspective view of an example drinkware lid that may be stored in the organizer.

While it may be of interest to understand and make clear this defined space 80, it may also be of interest to consider the size of various articles of interest that the organizer 11 may generally accommodate from a practical manner, such as those illustrated in FIGS. 10A-E (e.g., spice containers 30, 31, food 32, 34 and drink storage lids 36, etc.). For example, a typical rectangular/prism-shaped spice container 30 found at a grocery store such as that shown in FIG. 10A, may vary considerably in terms of depth 85 and length 86. However, it may be understood from a relative sample size, many rectangular prims-shaped spice containers 30 can have a depth 85 from 1.25 inches to 2.0 inches, and the majority of spice containers with this shape typically have a length 86 of at least 2.25 inches. As well, other spice containers 31 may utilize a thin vial generally under 2.0 inches in depth 87 typically available at a grocery store, such as those available from McCormick (Baltimore, Md.) under the Gourmet™ line of spices made by McCormick having a max depth range of approximately 1.80 inches as depicted in FIG. 10B.

As other examples, while food storage container lids 32, 34 (shown in FIGS. 10C-D) and drink container lids 36 (shown in FIG. 10E) may vary considerably, the diameter 88 of circular food container lids 32 and the diameter 89 of a drink container lids 36 generally are more than 2.75 inches in a majority of circumstances, while many drink container lids 36 generally have a minimum depth 90 of at least 0.90 inches such as those similar in shape to the 20 ounce tumbler drinkware lid available from Yeti Coolers (Austin, Tex.), which has a lid 36 diameter depth 90 of approximately 0.95 inches. In some embodiments, it may be of interest for the organizer 11 to accommodate for storage of these lids. While these considerations have been noted, it is understood that these are more so conditional guidelines for the purposes of designating specified dimensional ranges to accommodate a substantial variety of the articles mentioned in accordance with the present disclosure, and potential other articles of interest as well. Differing size articles mentioned previously (including spice containers 30, 31, food container lids 32, 34, and drink container lids 36) may fall out of ranges mentioned previously, and it is understood that the present disclosure is intended to accommodate a variety and/or multitude of articles of potential interest, while accounting for the spatial limitations of the empty gap as made clear below.

With these considerations mentioned previously in terms of storage potential of the empty gap and variety of articles that may desired to be stored using the organizer 11, the cabinet organizer 11 main body 12 has a predetermined depth dimension 57 range of approximately 1.0 inches to 1.82 inches, wherein the main body 12 depth dimension 57 may be as short as 1.0 inches in some embodiments, but in other embodiments the depth 57 may be up to 1.82 inches.

With regards to the main body 12 length dimension 62, the main body 12 has a predetermined length dimension 62 of at least approximately 2.75 inches.

Optionally, it is to be understood that the main body depth dimension 57 may be measured from any given location on the front side outer surface 54 to the exterior side rear surface 56 typically using a straight line of measurement in a general perpendicular fashion to the front 44 and back sides 46 as one commonly in the art would use for determining this generally common dimension of depth 57 (see FIG. 1A-B, FIG. 4, and FIG. 8 as examples for reference with regards to depth 57 dimension orientation). In some embodiments, the main body depth dimension 57 does not exceed the given depth dimension 57 range established prior throughout the main body where a depth measurement 57 can be determined. Optionally, it is to be understood that the main body length dimension 62 is measured from any given location on the left side outer surface 58 to the right side outer surface 60 typically using a straight line of measurement in a general perpendicular fashion to the left 48 and right sides 50 as one commonly in the art would use for determining this generally common dimension of length 62 (see FIG. 1A-B as examples for reference with regards to length dimension 62 orientation). In some embodiments, the main body length dimension 62 does not exceed the given length dimension 62 range established prior throughout the main body where a length measurement 62 can be determined.

As best shown in FIG. 1B the low profile organizer 11 further includes at least one backing plate 14. While two of the backing plates 14 are illustrated, in other embodiments a greater or lesser number can be provided. The backing plates 14 may be attached in any arrangement and/or configuration to the exterior surface 56 of the main body rear side 46. The backing plates 14 are configured to confront the interior surface 24 of a cabinet door 26. The backing plates 14 are constructed to be used in conjunction with the attachment means to connect the organizer 11 to the cabinet door 26. To note, while the thickness of the backing plates 14 may be of any desired thickness, in some embodiments the backing plate thickness may be desired to be as slender as possible such that the overall profile 91 of the organizer 11 does not take up more space than needed to efficiently store articles of interest when the cabinet door 26 is closed. For example, in some embodiments, the thickness of the backing plates 14 may be up to 0.125 inches which can provide less impact on the overall profile 91 potentially protruding into the shelving space, the overall profile 91 being the space occupied by the organizer 11 when the cabinet door 26 is closed. In other embodiments, the backing plate 14 may exceed a thickness of 0.125 inches depending on the strength and rigidity of the material used for the backing plates 14 to maintain adequate connection of the organizer 11 to the cabinet door 26. In embodiments where multiple main bodies 12 may be used on the same backing plates 14 (best shown in FIG. 9), the distance 92 from the bottom 94 of the top main body 12 to the top 96 of the bottom main body 12 may be at least 4.0 inches to accommodate for the height 97 or diameter 87 of some relatively larger food storage lids that may have a height 97 or diameter 87 of at least 4.0 inches, providing adequate access to articles stored in the bottom main body 12.

In some, embodiments, the organizer 11 may utilize one of various means for attaching the organizer 11 exterior surface of the rear side 56 of the main body 12 to the interior surface 24 of the cabinet door 26, optionally on the recessed panel 75 of the interior surface 24 of the cabinet door 26 as depicted in FIG. 2, FIG. 3A, and FIG. 6A-B as examples. When the organizer 11 and backing plate 14 are secured to the cabinet door 26 via a means of attachment, the distance 98 from the main body 12 front side 44 outer surface 54 to the interior surface 24 of the cabinet door 26 defines a cabinet organizer depth profile 100. With this organizer 11 comprising the at least one main body 12, at least one backing plate 14, and means of attachment 16, 18, 20, 22, the cabinet organizer depth profile 100 may allow for the organizer 11 to substantially fit into this empty gap generated along the interior surface 24 of the cabinet door 26 when the cabinet organizer 11 is secured to the cabinet door 26 and the cabinet 28 is in the closed position. For clarity, substantially may be defined as less than 3.5% of the main body maximum depth 57 protruding into the cabinet interior 63 beyond the defined gap.

With this construction and given main body dimension ranges, in one or more aspects, a balance in the dimensions may be utilized for a space-efficient cabinet organizer 11 that is slender enough with regards to main body depth 57 to account for the spatial limitations and considerations of this defined gap/space along the interior surface 24 of the cabinet door 26 when the cabinet door 26 is closed as to substantially fit in this gap and not substantially protrude into the shelving storage space, yet provide enough room to accommodate a variety and/or multitude of articles of interest for storage within a variety of cabinets 28 made with this construction.

Figure 4:
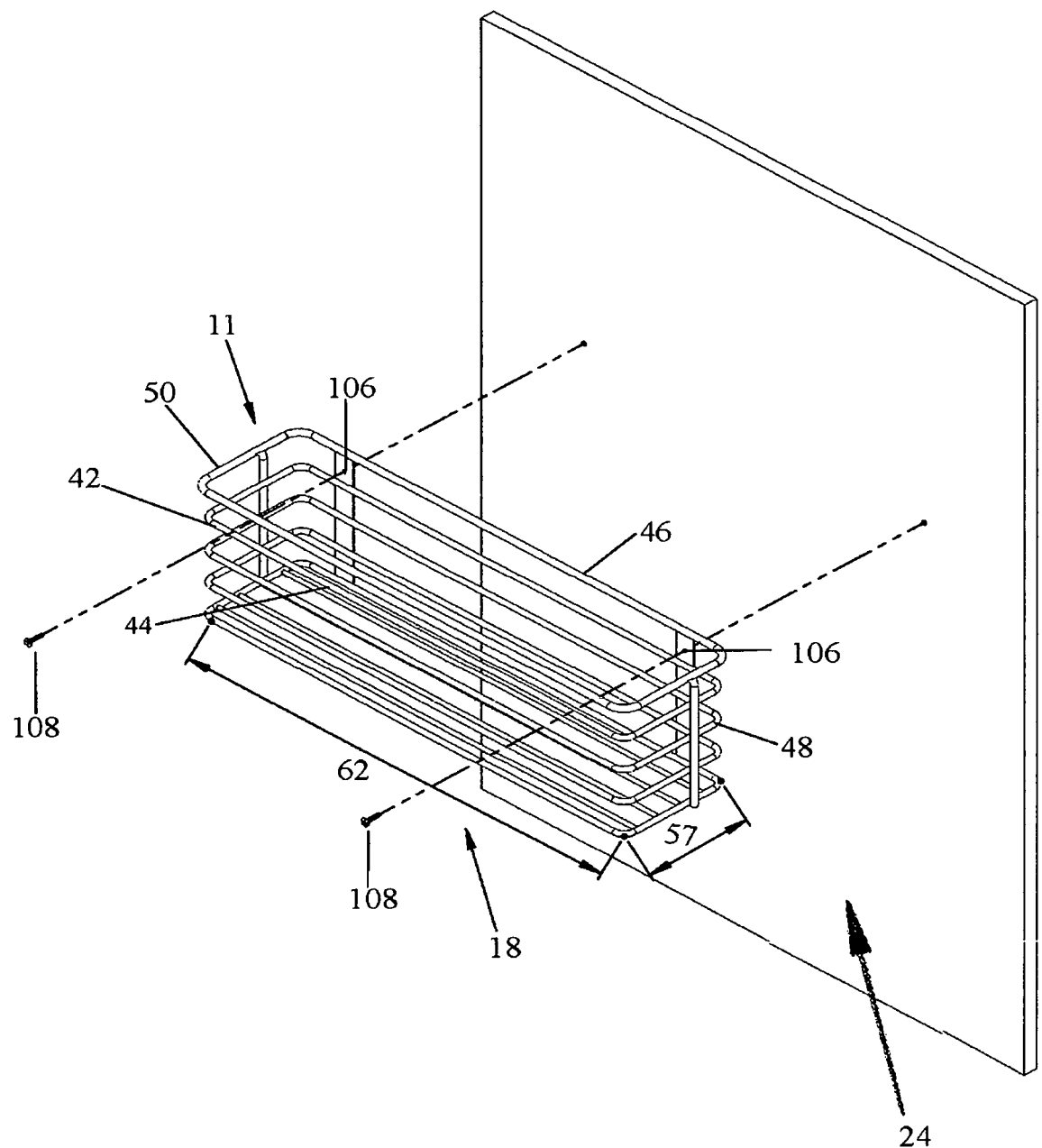
FIG. 4 is a perspective, exploded view of another embodiment of the low profile organizer in accordance with principles of the present disclosure, with the main body comprised of a wire rod framework, the organizer having holes in the backing plates for using mechanical fixation of the organizer to the cabinet door as means of attachment.

Attachment means are primarily for purposes of complete construction of the organizer 11 in its entirety. In some embodiments, the attachment means 16 of the organizer 11 to the interior surface 24 of the cabinet door 26 may include an attachment construction utilizing double-sided adhesive 102 (best shown in FIG. 2), wherein at least one backing plate 14 is adapted to receive double-sided adhesive 102 on the backing plate bonding surface 104. The double-sided adhesive 102 is configured to be arranged between the backing plate 14 and the cabinet door 26 for securing the organizer 11 to the interior surface 24 of the cabinet door 26. In embodiments where more than one backing plate 14 is utilized, the double-sided adhesives 102 may be identical. The adhesive 102 can comprise any suitable sheet, film, layer, etcetera that comprises pressure-sensitive adhesive functionality on oppositely-facing surfaces. The double-sided adhesive 102 can comprise any suitable adhesive that is available in the form of a sheet, tape, roll, etcetera, from which a discrete piece of adhesive can be obtained that is suitable for being contacted with and bonded to the backing plate 14 bonding surface 104. Suitable adhesives thus include double-stick tapes, laminating adhesives, double-sided foam tapes, and the like, as are commonly known in the art. In some embodiments, the double-sided adhesive 102 may have properties that can allow the adhesive to be securely attached to a surface, and to be later removed from the surface without visual disfigurement of, or leaving adhesive residue on, the surface. For example, the double-sided adhesive strips 102 under the Command® trade designation available from 3M Company (St. Paul, Minn.) provide a suitable double-sided adhesive 102 with the aforementioned properties. As best shown in FIG. 4, in other embodiments, instead of utilizing double-sided adhesive 102 and the backing plate 14 adapted to receive double-sided adhesive 102, the backing plate 14 may contain at least one hole 106 for means of attachment 18 of the organizer to the interior surface 24 of the cabinet door 26 using mechanical fixation (e.g., nails, screws 108, etc.) for securing the organizer 11 to the interior surface 24 of the cabinet door 26.

In other embodiments, the organizer may utilize a coupling mechanism of attachment in combination with at least one double-sided adhesive 102 as attachment means 20 of the organizer 11 to the interior surface 24 of the cabinet door 26 (best shown in FIGS. 5A-6B). The construction utilizes at least one separate mounting plate 110 with the mounting plate 110 serving as an intermediary structure between the backing plate 14 attached to the main body 12 and the interior surface 24 of the cabinet door 26. At least one coupling bracket 112 is provided on each backing plate 14, forming a first engagement feature 112. The mounting plate 110 forms a bonding surface 114 and a second engagement feature 116, wherein the bonding surface 114 is adapted to receive a double-sided adhesive 102 to attach the mounting plate 110 to the interior surface 24 of the cabinet door 26, and further wherein the second engagement feature 116 is formed opposite the bonding surface 114, facing the backing plate 14. Each of the first and second engagement features 112, 116 has a complimentary construction to each other, configured to provide releasable engagement between the backing plate and the mounting plate 110.

For example, the first engagement feature 112 on the backing plate 14 may comprise of a bracket in the shape of a hook 118 or finger, with the second engagement feature 116 on the mounting plate 110 providing a relatively hollow space 120 meant to selectively receive the corresponding hook 118 or finger on the backing plate 14. The first and second engagement features 112, 116 may have any complimentary construction, so long as the engagement features are configured to releasably engage each another. Optionally, the hook 118 may have a subtle protrusion 122 to help establish a snap fit connection mechanism of attachment. With regards to the bonding surface 114 provided on the mounting plate 110, the bonding surface 114 may be adapted to receive a double-sided adhesive 102, with the double-sided adhesive 102 configured to be arranged between the bonding surface 114 of the mounting plate 110 and the interior surface 24 of the cabinet door 26 for securing the storage organizer 11 to the cabinet door 26. The double-sided adhesive 102 utilized may be of the same construction as the double-sided adhesive 102 mentioned in the previous embodiments.

In other embodiments utilizing a similar mechanism with complimentary first and second engagement features 112, 116 on at least one backing plate 14 and at least one corresponding mounting plate 110, instead of the mounting plate 110 having a bonding surface 114 adapted to receive a double-sided adhesive 102, the mounting plate 110 may have at least one hole 106 wherein the hole 106 is utilized for mechanical fixation (e.g., nails, screws 108, etc.) of the mounting plate 110 to the interior surface 24 of the cabinet door 26 (best shown in FIG. 7) as means of attachment 22. The complimentary engagement features 112, 116 are of the same principles as the engagement features specified in the aforementioned embodiments. For example, the engagement features may utilize the same hook 118 or finger, and hollow space 120 engagement features mentioned in the previous embodiment, or may have any complimentary, coupling construction wherein each of the first and second engagement features 112, 116 has a complimentary construction to each other, configured to provide releasable engagement between the backing plate 14 and the mounting plate 110.

In other embodiments a storage organizer 11 may not include at least one backing plate 14 attached to the main body 12 (as best shown in FIG. 8). Such embodiments may utilize similar means of attachment to interior surface 24 of the cabinet door 26 in accordance with embodiments mentioned previously, however with some minor differences. In some embodiments (such as FIG. 8), the rear side 46 may have the exterior surface 56 of the rear side 46 directly adapted to receive at least one double-sided adhesive 102 (versus a backing plate 14) wherein the means of attachment of the storage organizer 11 to the cabinet door 26 may include using at least one double-sided adhesive 102 configured to be arranged between the rear side 46 of the main body 12 and the cabinet door 26 for securing the storage organizer 11 to the interior surface 24 of the cabinet door 26. As mentioned previously, the double-sided adhesive 102 utilized is in accordance with the same principles as the aforementioned double-sided adhesive 102. In other embodiments, the rear side 46 of the main body 12 may contain at least one hole 106 for means of attachment of the organizer 11 to the interior surface 24 of the cabinet door 26 using mechanical fixation (e.g., nails, screws 108, etc.), versus having a backing plate 14 wherein the backing plate 14 contains at least one hole 106 for mechanical fixation.

Figure 5B:
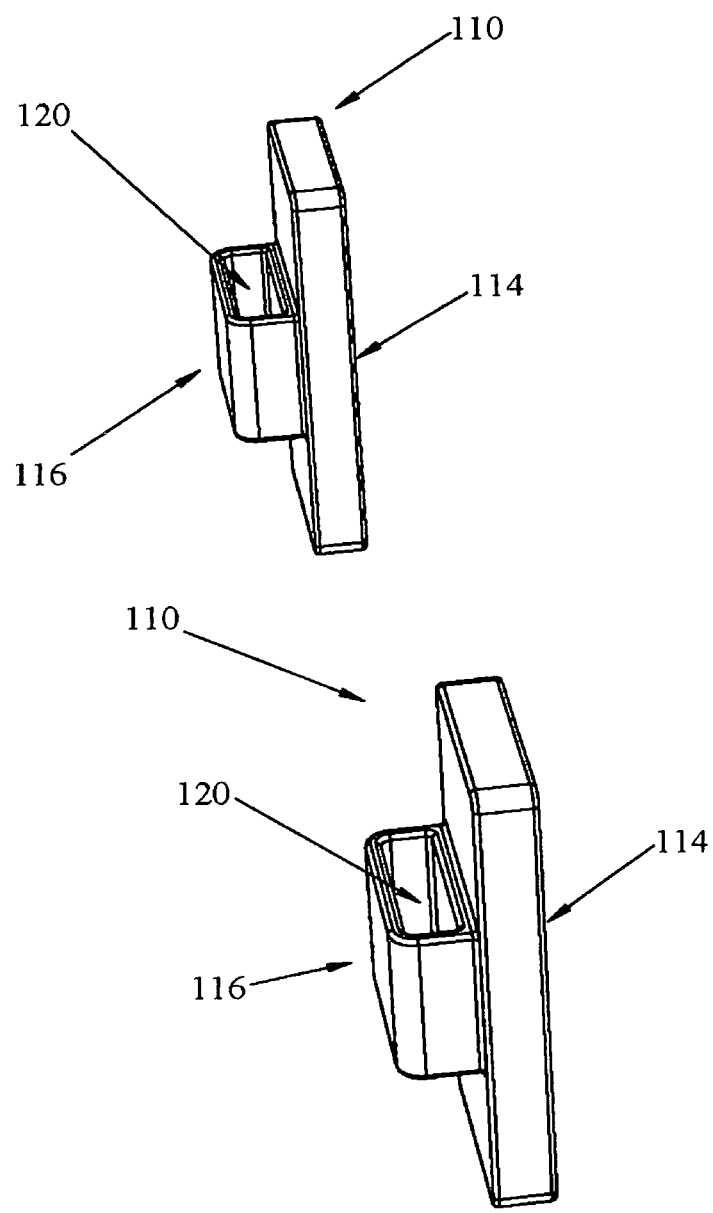
FIG. 5B is a front perspective view of the mounting plates that may be utilized for means of attachment of the organizer embodiment of FIG. 5A.

In other embodiments, the organizer 11 may utilize a similar mechanism of attachment using at least one mounting plate 110 in combination with at least one double-sided adhesive 102 as mentioned in previous embodiments and illustrated in FIGS. 5A-B. The construction of attachment utilizes a similar, separate mounting plate 110 with the mounting plate 110 serving as an intermediary structure between the main body 12 and the interior surface 24 of the cabinet door 26. The complimentary engagement features 112, 116 are of similar principles as the engagement features 112, 116 specified in the previously-mentioned embodiments. At least one coupling bracket 112 is provided on the exterior surface 56 of the rear side 46 of the main body 12, forming a first engagement feature 112. At least one mounting plate 110 forms a bonding surface and a second engagement feature 116, wherein the bonding surface 114 is adapted to receive a double-sided adhesive 102 to attach the mounting plate to the interior surface of the cabinet door, and further wherein the second engagement feature 116 is formed opposite the bonding surface, facing the exterior surface 56 of the rear side 46 of the main body 12. Each of the first and second engagement 112, 116 features has a complimentary construction to each other, configured to provide releasable engagement between the main body 12 and the mounting plate 110.

For example, the engagement features may utilize the same hook 118 or finger, and hollow space 120 engagement features mentioned in the previous embodiment, or may have any complimentary, coupling construction, so long as the engagement features 112, 116 are configured to releasably engage each other. However, with the current embodiment not having backing plates 14 attached to the main body 12, the first engagement feature 112 is formed directly on the main body 12 rear side 46 exterior surface 56 as a homogenous structure wherein the main body 12 and first engagement coupling bracket 112 are integrally formed (e.g., the storage device 11 is an injection molded plastic article), versus the coupling brackets 112 being formed or attached on backing plates 14. Last, a double-sided adhesive 102 is configured to be arranged between the bonding surface 114 of the mounting plate 110 and the cabinet door 26 for securing the organizer 11 to the cabinet door 26. The double-sided adhesive 102 utilized is similar in nature as the double-sided adhesive 102 mentioned in the previous embodiments, having the same construction and in accordance with the same principles as the aforementioned double-sided adhesive 102.

In other embodiments utilizing a similar releasable-engagement mechanism with complimentary first and second engagement features 112, 116 as the previous embodiment (with the first engagement feature 112 provided directly on the exterior surface 56 of the rear side 46 of the main body 12, wherein the main body 12 and first engagement coupling brackets 112 are integrally formed into a homogenous structure), instead of the mounting plates 110 having a bonding surface 114 adapted to receive a double-sided adhesive 102, the mounting plates 110 may each have at least one hole 106 wherein the hole 106 is utilized for mechanical fixation (e.g., nails, screws 108, etc.) of the mounting plate 110 to the interior face 24 of the cabinet door 26. The complimentary engagement features 112, 116 are of the same principles as the engagement features specified in the aforementioned embodiments. For example, the engagement features 112, 116 may utilize the same hook 118 or finger, and hollow space 120 engagement features mentioned in the previous embodiment, or may have any complimentary, coupling construction, so long as the engagement features are configured to releasably engage each other.

To note, while the present disclosure has been addressed primarily towards a particular cabinet storage space and articles of interest generally found within a kitchen cabinet, the present discloser may be applicable to other articles of interest elsewhere beyond the confines of a kitchen, and applicable towards cabinets elsewhere with this predefined construction to which the present disclosure can accommodate—being in accordance with the spirit and scope of the present disclosure.

While the low profile organizer system has been described with reference to the disclosed embodiments, it is to be understood that the invention is not limited to these disclosed embodiments. Many modifications and other embodiments of the invention will come to mind of those skilled in the art without departing from the spirit and scope of the present disclosure. For example, as yet another means of attachment for securing the organizer 11 to the interior surface 24 of a cabinet door 26, in embodiments involving an intermediate mounting plate 110, instead of a coupling mechanism of attachment connecting the main body 12 or backing plates 14 to the mounting plate 110, hooks may be provided on each mounting plate 110 (in place of a coupling, second engagement feature 116) utilized by associated holes located on the main body 12 rear side 46 (or backing plates 14) of the main body 12. This would allow the main body 12 to hang by the mounting plate hooks via the holes located on the main body 12. Further wherein, the mounting plates 110 are attached to the interior surface 24 of the cabinet door 26 using double-sided adhesive 102 or mechanical fixation in accordance with the similar embodiments mentioned previously.

What is claimed is:

1. A door-mountable cabinet organizer system comprising:
  a. at least one cabinet organizer comprising:
    i. at least one main body comprising:
      a front side and a rear side opposing each other, the front side comprising a front side outer surface opposing the rear side, the rear side comprising an interior surface facing the front side and an exterior surface facing an opposing direction of the interior surface of the rear side, wherein distance between the front side outer surface and the rear side exterior surface defines a depth dimension of the main body;

a left side extending from the rear side to the front side on one end of the main body, and a right side extending from the rear side to the front side on the opposing end of the main body from the left side, wherein the left side comprises an outer surface opposing the right side and an interior surface facing the right side, the right side comprising an outer surface opposing the left side and an interior surface facing the left side, wherein distance between the left side outer surface and the right side outer surface defines length dimension of the main body;

a bottom side extends along bottom of the front side, the rear side, the left side, and the right side, providing enclosure to the main body from bottom, wherein the bottom side is a primary shelf for supporting articles;

wherein the main body length dimension has a predetermined length of at least 2.75 inches;

wherein the main body depth dimension range is within a predetermined range of 1.0 inches to 1.82 inches;

ii. at least one backing plate attached to the exterior surface of the rear side of the main body, configured to confront an interior surface of a cabinet door of a cabinet;

iii. means for attaching the backing plate to a recessed panel on the interior surface of the cabinet door, securing the cabinet organizer to the interior surface of the cabinet door of the cabinet;

b. the cabinet comprising:
 i. an interior, an exterior, and the cabinet door separating the interior from the exterior, the cabinet door pivotably attached to the cabinet and configured to pivot between an open and a closed position;
 ii. wherein the interior comprises at least one shelf and is accessible through a cabinet face frame defining a cabinet opening, wherein the cabinet face frame includes an interior face frame edge opposing an exterior face frame edge, the interior face frame edge abutting the cabinet interior with the exterior face frame edge adjacent to the cabinet door when the cabinet is in the closed position;
 iii. wherein the shelf includes an outer shelf edge facing the cabinet face frame, wherein the distance from the outer shelf edge to the interior face frame edge is at most 0.5 inches;
 iv. wherein the cabinet door comprises the interior surface facing the cabinet interior, overlaying the face frame, when the cabinet door is in the closed position;
 v. wherein the interior surface of the cabinet door has the recessed panel, with the recessed panel centered as to not overlay the face frame of the cabinet interior while facing the cabinet interior in the closed position;
 vi. wherein the interior surface of the cabinet door including the recessed panel, the cabinet face frame, and the outer shelf edge define boundaries of a gap generated along the interior surface of the cabinet door when the cabinet is in the closed position;

c. wherein distance from the front side outer surface of the organizer to the interior surface of the cabinet door defines a cabinet organizer depth profile, whereby the cabinet organizer depth profile may substantially fit into the gap generated along the interior surface of the cabinet door when the cabinet organizer is secured to the cabinet door and the cabinet is in the closed position, substantially meaning less than 3.5% of the main body maximum depth protruding into the cabinet interior beyond the defined gap.

2. The storage organizer of claim 1, wherein the main body is selected from the group consisting of least one caddy and shelf.

3. The storage organizer of claim 1 wherein said backing plate is adapted to receive a double-sided adhesive as means for attaching the main body to the cabinet door.

4. The storage organizer of claim 1 wherein said backing plate contains at least one hole as means for attaching at least one backing plate to the interior surface of the cabinet door using mechanical fixation, for securing the storage organizer to the interior surface of the cabinet door.

5. The storage organizer of claim 1 wherein said means for attachment comprises:
 a. at least one coupling bracket provided on the backing plate, the coupling bracket forming a first engagement feature;
 b. at least one mounting plate forming a bonding surface and a second engagement feature, wherein the mounting plate is configured to be arranged between the backing plate and cabinet door, wherein the bonding surface is adapted to receive a double-sided adhesive to attach the mounting plate to the interior surface of the cabinet door, wherein the second engagement feature is formed opposite the bonding surface, facing the backing plate;
 c. wherein each of the first and second engagement features has a complimentary construction to each other, configured to provide releasable engagement between the backing plate and the mounting plate;
 d. a double-sided adhesive configured to be arranged between the bonding surface of the mounting plate and the cabinet door for securing the storage organizer to the cabinet door.

6. The storage organizer of claim 1 wherein said means for attachment comprises:
 a. at least one coupling bracket provided on the backing plate, the coupling bracket forming a first engagement feature;
 b. at least one mounting plate including at least one hole and forming a second engagement feature, the mounting plate configured to be arranged between the backing plate and the interior surface of the cabinet door;
 c. wherein each of the first and second engagement features has a complimentary construction to each other, configured to provide releasable engagement between the backing plate and the mounting plate;
 d. said hole on the mounting plate used as the attachment of the mounting plate to host a mechanical fixation for securing the storage organizer to the interior surface of the cabinet door.

7. A door-mountable cabinet organizer system comprising:
 a. at least one cabinet organizer comprising:
  i. at least one main body comprising:
   a front side and a rear side opposing each other, the front side comprising a front side outer surface opposing the rear side, the rear side comprising an interior surface facing the front side and an exterior surface facing an opposing direction of the interior surface of the rear side, wherein distance between the front side outer surface and the rear side exterior surface defines a depth dimension of the main body;

a left side extending from the rear side to the front side on one end of the main body, and a right side extending from the rear side to the front side on the opposing end of the main body from the left side, wherein the left side comprises an outer surface opposing the right side and an interior surface facing the right side, the right side comprising an outer surface opposing the left side and an interior surface facing the left side, wherein distance between the left side outer surface and the right side outer surface defines a length dimension of the main body;

a bottom side extends along bottom of the front side, the rear side, the left side, and the right side, providing enclosure to the main body from bottom, wherein the bottom side is a primary shelf for supporting articles;

wherein the main body length dimension has a predetermined length of at least 2.75 inches;

wherein the main body depth dimension range is within a predetermined range of 1.0 inches to 1.82 inches;

ii. means for attaching the exterior surface of the rear side of the main body to a recessed panel on an interior surface of a cabinet door of a cabinet, securing the cabinet organizer to the interior surface of the cabinet door;

b. the cabinet comprising:
i. an interior, an exterior, and the cabinet door separating the interior from the exterior, the cabinet door pivotably attached to the cabinet and configured to pivot between an open and a closed position;
ii. wherein the interior comprises at least one shelf and is accessible through a cabinet face frame defining a cabinet opening, wherein the cabinet face frame includes an interior face frame edge opposing an exterior face frame edge, the interior face frame edge abutting the cabinet interior with the exterior face frame edge adjacent to the cabinet door when the cabinet is in the closed position;
iii. wherein the shelf includes an outer shelf edge facing the cabinet face frame, wherein the distance from the outer shelf edge to the interior face frame edge is at most 0.5 inches;
iv. wherein the cabinet door comprises the interior surface facing the cabinet interior, overlaying the face frame, when the cabinet door is in the closed position;
v. wherein the interior surface of the cabinet door has the recessed panel, with the recessed panel centered as to not overlay the face frame of the cabinet interior while facing the cabinet interior in the closed position;
vi. wherein the interior surface of the cabinet door including the recessed panel, the cabinet face frame, and the outer shelf edge define boundaries of a gap generated along the interior surface of the cabinet door when the cabinet is in the closed position;

c. wherein distance from the front side outer surface of the organizer to the interior surface of the cabinet door defines a cabinet organizer depth profile, whereby the cabinet organizer depth profile may substantially fit into the gap generated along the interior surface of the cabinet door when the cabinet organizer is secured to the cabinet door and the cabinet is in the closed position, substantially meaning less than 3.5% of the main body maximum depth protruding into the cabinet interior beyond the defined gap.

8. The storage organizer of claim 7 wherein the main body or main bodies, is selected from the group consisting of least one caddy and shelf.

9. The storage organizer of claim 7 wherein said exterior surface of the rear side is adapted to receive at least one double-sided adhesive as means for attaching the main body to the cabinet door.

10. The storage organizer of claim 7 wherein said rear side contains at least one hole for the means of attachment of at least one backing plate to the interior surface of the cabinet door using mechanical fixation, for securing the storage organizer to the interior surface of the cabinet door.

11. The storage organizer of claim 7 wherein said means for attachment comprises:
a. at least one coupling bracket provided on the exterior surface of the rear side of the main body, the coupling bracket forming a first engagement feature;
b. at least one mounting plate forming a bonding surface and a second engagement feature, wherein the mounting plate is configured to be arranged between the main body and cabinet door, wherein the bonding surface is adapted to receive a double-sided adhesive to attach the mounting plate to the interior surface of the cabinet door, and wherein the second engagement feature is formed opposite the bonding surface, facing the exterior surface of the rear side of the main body;
c. wherein each of the first and second engagement features has a complimentary construction to each other, configured to provide releasable engagement between the main body and the mounting plate;
d. a double-sided adhesive configured to be arranged between the bonding surface of the mounting plate and the cabinet door for securing the storage organizer to the cabinet door.

12. The storage organizer of claim 7 wherein said means for attachment is comprised of:
a. at least one coupling bracket provided on the exterior surface of the rear side of the main body, the coupling bracket forming a first engagement feature;
b. at least one mounting plate including at least one hole and forming a second engagement feature, the mounting plate configured to be arranged between the main body and the interior surface of the cabinet door;
c. wherein each of the first and second engagement features has a complimentary construction to each other, configured to provide releasable engagement between the main body and the mounting plate;
d. said hole on the mounting plate used as the attachment of the mounting plate to host a mechanical fixation for securing the storage organizer to the interior surface of the cabinet door.

* * * * *